United States Patent
Raj et al.

(10) Patent No.: US 10,157,142 B2
(45) Date of Patent: Dec. 18, 2018

(54) OFFLOAD DATA TRANSFER ENGINE FOR A BLOCK DATA TRANSFER INTERFACE

(71) Applicant: INTEL CORPORATION, Santa Clara, CA (US)

(72) Inventors: Ashok Raj, Portland, OR (US); Sivakumar Radhakrishnan, Portland, OR (US); Dan J. Williams, Forest Grove, OR (US); Vishal Verma, Longmont, CO (US); Narayan Ranganathan, Bangalore (IN); Chet R. Douglas, Tucson, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 117 days.

(21) Appl. No.: 15/280,965

(22) Filed: Sep. 29, 2016

(65) Prior Publication Data
US 2018/0089099 A1    Mar. 29, 2018

(51) Int. Cl.
*G06F 12/00* (2006.01)
*G06F 12/10* (2016.01)
*G06F 3/06* (2006.01)

(52) U.S. Cl.
CPC .............. *G06F 12/10* (2013.01); *G06F 3/065* (2013.01); *G06F 3/0608* (2013.01);
(Continued)

(58) Field of Classification Search
CPC ............. G06F 12/10; G06F 2212/1032; G06F 2212/152; G06F 2212/65; G06F 3/065; G06F 3/0608; G06F 3/0631; G06F 3/0644; G06F 3/0659; G06F 3/0683; G06F 3/0646; G06F 3/0647
See application file for complete search history.

(56) References Cited

U.S. PATENT DOCUMENTS 8,607,129 B2   12/2013   Radhakrishnan et al.
9,141,469 B2    9/2015   Radhakrishnan et al.
(Continued)

OTHER PUBLICATIONS

Intel Corporation, "NVDIMM Block Window Driver Writer's Guide", Apr. 2015, 35 pp.
(Continued)

*Primary Examiner* — Shawn X Gu
(74) *Attorney, Agent, or Firm* — Konrad Raynes Davda & Victor LLP

(57) ABSTRACT

In one embodiment, a block data transfer interface employing offload data transfer engine in accordance with the present description includes an offload data transfer engine executing a data transfer command set to transfer a block of data in a transfer data path from a source memory to a new region of a destination memory, wherein the transfer data path bypasses a central processing unit to minimize or reduce involvement of the central processing unit in the block transfer. In response to a successful transfer indication, a logical address is re-mapped to a physical address of the new region of the destination memory, instead of a physical address of the original region of the destination memory. In one embodiment, the re-mapping is performed by a central processing unit. In another embodiment, the re-mapping is performed by the offload data transfer engine. Other aspects are described herein.

24 Claims, 8 Drawing Sheets

(52) U.S. Cl.
CPC .......... *G06F 3/0631* (2013.01); *G06F 3/0644* (2013.01); *G06F 3/0646* (2013.01); *G06F 3/0647* (2013.01); *G06F 3/0659* (2013.01); *G06F 3/0683* (2013.01); *G06F 2212/1032* (2013.01); *G06F 2212/152* (2013.01); *G06F 2212/65* (2013.01)

(56) References Cited

U.S. PATENT DOCUMENTS

| | | | | |
|---|---|---|---|---|
| 2011/0296133 A1* | 12/2011 | Flynn | .................. | G06F 11/1048 711/171 |
| 2013/0166820 A1* | 6/2013 | Batwara | .............. | G06F 12/0246 711/103 |

OTHER PUBLICATIONS

Intel Corporation, "Intel QuickData Technology Software Guide for Linux", White Paper, May 2008, 7 pp.
Wikipedia, "Northbridge (Computing)", [online] Last Modified on Jun. 14, 2016, [Retrieved on Jul. 9, 2016], Retrieved from the Internet at <URL: http://en.wikipedia.org/wiki/Northbridge_(computing)>, 3 pp.

* cited by examiner

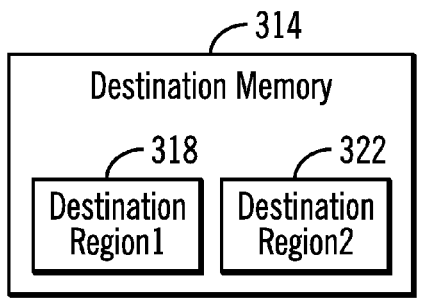
FIG. 7A
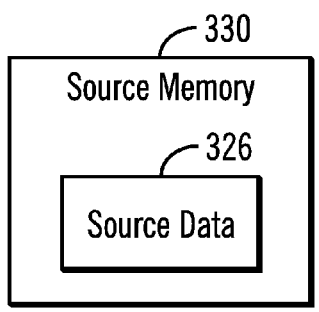
FIG. 7B
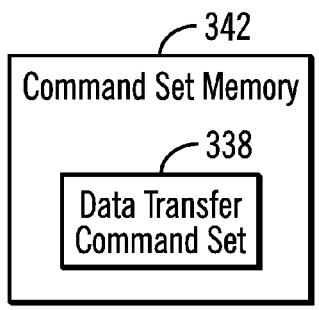
FIG. 7C
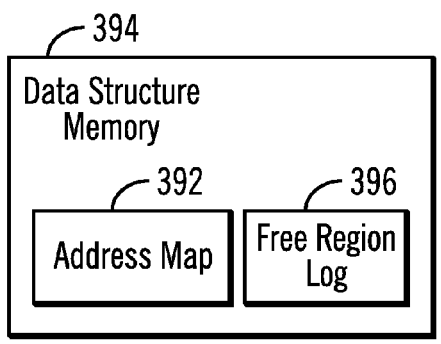
FIG. 7D
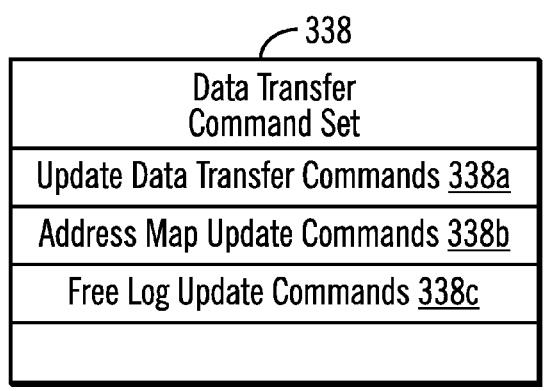
FIG. 7E
FIG. 8

OFFLOAD DATA TRANSFER ENGINE FOR A BLOCK DATA TRANSFER INTERFACE

TECHNICAL FIELD

Certain embodiments of the present description relate generally to management of memory resources.

BACKGROUND

A block data transfer interface is frequently employed to expand the effective address space available to store data. A logical address within the address space of the central processing unit of the computing system is mapped by an address map of the block data transfer interface to a block of physical addresses of the memory which is often non-volatile or persistent memory.

In contrast to volatile memory, non-volatile memory can store data that persists even after the power is removed from the non-volatile memory. Examples of non-volatile or persistent memory include disk drives and solid state drives. However, if power is lost before completion of a data transfer to the memory, the data stored in a region may be a mixture of both newly transferred data and also old data which was not successfully updated with new data prior to the loss of power. Such a region containing both new data and old data which was not successfully updated is often referred to as a "torn" memory region.

To prevent read operations to such torn memory regions which can return corrupted data, the block data transfer interface may be configured to ensure "atomicity" of a data transfer in which either a data transfer is completed in its entirety, or if not, a partial data transfer is given no effect. Thus, if power fails at any time during a write operation to a region, atomicity can ensure that a subsequent read of that region will either return the old data intact if the write operation was not completed, or will return the new data if the write to the region had completed.

One approach to providing atomicity, is for the block transfer interface to write new update data to an unused area of the memory instead of to the original area containing the old data to be updated. If the data transfer to the new region is successfully completed, the block transfer interface updates the address map so that a logical address for the data is no longer mapped to physical addresses of the original region, but is instead re-mapped to the new region containing the updated data. Hence, a read operation addressed to the logical address is redirected to the new memory region containing the successfully updated data. A log which tracks available memory regions, often referred to as a free region log, may be updated to indicate that the original region is available to store other data.

Conversely, if the data transfer to the new region is not successfully completed due to a power failure, for example, upon return of power, the block transfer interface does not update the address map so that the logical address for the data continues to be mapped to physical addresses of the original region. Thus, the logical address is not re-mapped to the new region containing the partially updated data. Moreover, the free region log continues to indicate the original region as in use (occupied) and thus unavailable to store other data. Hence, a subsequent read operation addressed to the logical address can continue to be directed to the original memory region as if no portion of the incomplete data transfer took place.

BRIEF DESCRIPTION OF THE DRAWINGS

Embodiments of the present disclosure are illustrated by way of example, and not by way of limitation, in the figures of the accompanying drawings in which like reference numerals refer to similar elements.

FIGS. 7a-7d depict various embodiments of memory for a block data transfer interface employing an offload data transfer engine in accordance with the present description.

FIG. 7e depicts an embodiment of a data transfer command set for a block data transfer interface employing an offload data transfer engine in accordance with the present description.

FIG. 8 depicts an embodiment of data transfer, address map update and free region log update operations in a block data transfer interface in accordance with the present description.

DESCRIPTION OF EMBODIMENTS

Figure 1:
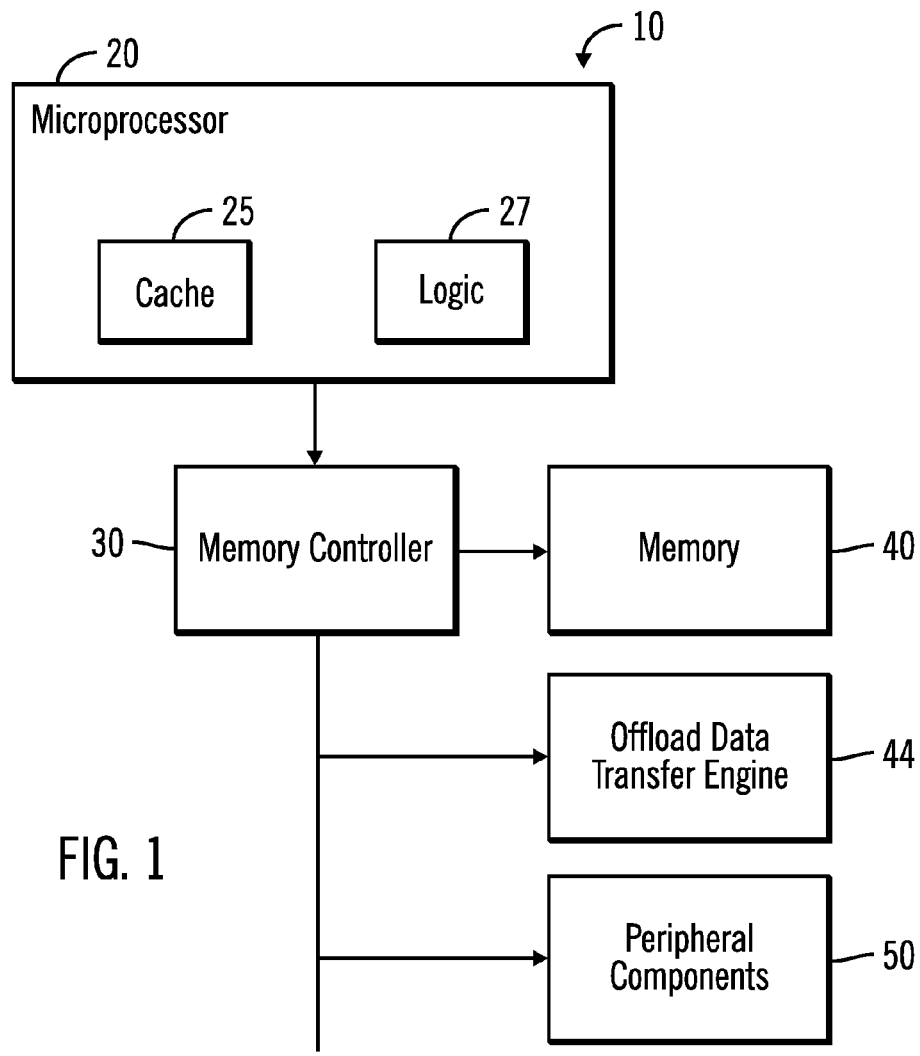
FIG. 1 depicts a high-level block diagram illustrating one embodiment of a system employing a block data transfer interface having an offload data transfer engine in accordance with the present description.

In the description that follows, like components have been given the same reference numerals, regardless of whether they are shown in different embodiments. To illustrate one or more embodiments of the present disclosure in a clear and concise manner, the drawings may not necessarily be to scale and certain features may be shown in somewhat schematic form. Features that are described or illustrated with respect to one embodiment may be used in the same way or in a similar way in one or more other embodiments or in combination with or instead of features of other embodiments.

In one aspect of the present description, a block data transfer interface is provided having an offload data transfer engine to perform operations of the block data transfer interface. In one embodiment, a data transfer command set is forwarded from a processor such as a central processing unit to an offload data transfer engine of the block data transfer interface, to initiate a transfer by the offload data transfer engine of a block of data, from a source memory to a new region of a destination memory. The offload data transfer engine in executing the data transfer command set, transfers the block of data in a transfer data path from the source memory to a region of the destination memory, wherein the transfer data path bypasses the central processing unit.

In addition, the offload data transfer engine also confirms the successful transfer of the block of data, and provides a successful transfer indication of successful transfer of the block of data to the new region. In response to the successful transfer indication, a logical address is re-mapped to a physical address of the new region of the destination memory, instead of a physical address of the original region of the destination memory. In one embodiment, the re-mapping is performed by a central processing unit. In another embodiment, the re-mapping is performed by the offload data transfer engine in response to an address map update command chained to a successfully executed update data transfer command of the data transfer command set.

As explained in greater detail below, It is appreciated that a block data transfer interface employing an offload data transfer engine as described herein for transfer of data to a destination memory can significantly improve performance of a computing system. For example, in one embodiment, after invoking the offload data transfer engine as described above, the transfer of update data through the block data transfer interface may be achieved with no further involvement of the central processing unit. For example, the offload data transfer engine may be invoked with a single "doorbell ring" which makes a data transfer command set available to the offload data transfer engine to execute.

Accordingly, the central processing unit is freed to perform other tasks while the offload data transfer engine of the block data transfer interface, transfers the data and ensures that the data was successfully transferred. For example, status checks are performed by the offload data transfer engine as a part of the execution of the descriptors of the provided data transfer command set. Moreover, the offload data transfer engine can frequently accomplish a transfer of a block of data consuming significantly lower amounts of power as compared to that consumed by a central processing unit transferring a similar block of data.

Figure 10:
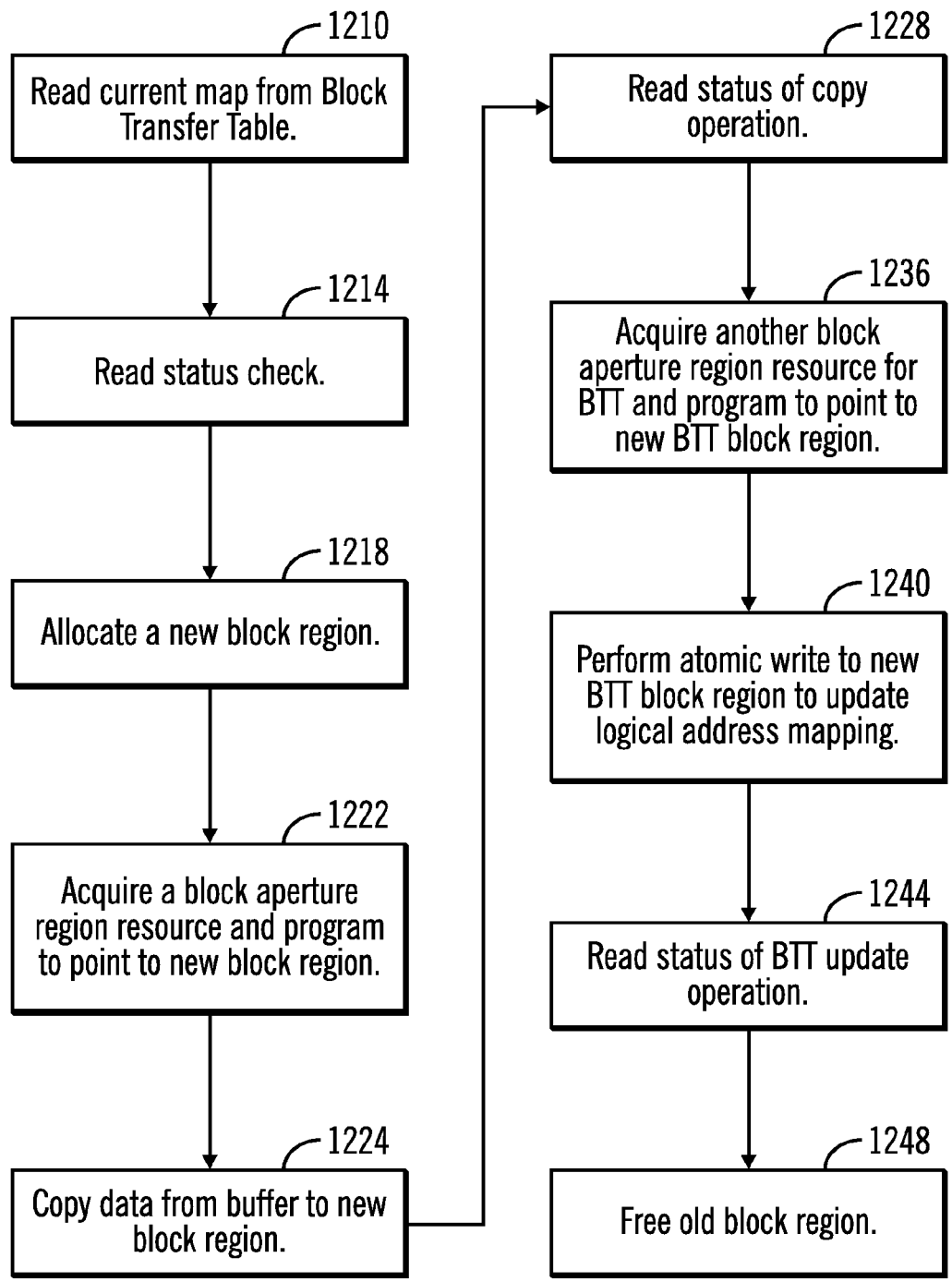
FIG. 10 depicts an example of operations of a prior art block data transfer interface.

Still further, the use of limited resources such as block aperture region resources may be reduced or eliminated. For example, in various known computer systems, a block data transfer interface is typically provided by a block transfer table layer in which a central processing unit executes associated block transfer table layer software. FIG. 10 shows an example of operations of such an existing block data transfer interface employing a central processing unit to perform the data transfer operations of the block data transfer interface.

In this example, a block of update data is being written to memory to update an existing block of data. In an initial operation, the block transfer table layer executed by the central processing unit, reads (block 1210, FIG. 10) the current logical-to-physical address map from the block transfer table (BTT). This read operation is typically an un-cached (UC) read which can take a relatively long time to complete as compared to a cached read operation.

The central processing unit subsequently performs a second un-cached read operation to check (block 1214) the status of the map reading operation to ensure that the address map read operation was successful. To provide a destination for the update data, a new memory block region is allocated (block 1218) by the central processing unit. Because the physical addresses of the new memory block region are not within the address space of the central processing unit, a block aperture region resource is acquired (block 1222) by the central processing unit which then programs the acquired block aperture region resource to point to the source of the new block of update data to be written, such as a buffer which temporarily stores the block of update data. A block aperture region resource programming operation is typically an un-cached (UC) write operation by the central processing unit which can take a relatively long time to complete as compared to a cached write operation.

Using the acquired block aperture region resource, the central processing unit copies (block 1224) the new block of update data from the source (such as the identified buffer) to the new destination memory block region previously allocated (block 1218) by the central processing unit. An example of such a copy operation using a block aperture region resource is referred to as a "MEMCPY" operation. To ensure that the block of update data was successfully copied from the source to the new destination memory block region, the central processing unit checks (block 1228) the status of the copy operation in another read operation which is again, typically an un-cached read operation.

Upon confirmation of the successful completion of the transfer to the block of update data to the new destination memory block region, the central processing unit acquires (block 1236) another block aperture region resource and programs the acquired block aperture region resource to point to a new or update entry of the block transfer table. As previously mentioned, a block aperture region resource programming operation is typically an un-cached (UC) write operation by the central processing unit. To update the block transfer table, an "atomic" write (block 1240) is performed by the central processing unit to update the block transfer table to map the logical addresses which were previously mapped to the original block region containing the original data, to the new memory region now containing the new block of update data. An atomic write is a write operation in which the atomicity of the write transaction is ensured.

To ensure that the block transfer table was successfully updated, the central processing unit, in another un-cached read operation, checks (block 1244) the status of atomic write operation in another read operation which is again, typically an un-cached read operation. Upon confirmation of the successful completion of the block transfer table update, the central processing unit frees (block 1248) the old block region by updating a free region log to indicate that the original block region is available for storing other data. The free log updating operation typically involves another two un-cached write operations. Thus, another block aperture region resource is acquired and programmed since the free log is typically located in another area of the system memory. Accordingly, the block transfer table layer executed by the central processing unit typically employs approximately eight un-cached read or write operations to successfully complete a block data transfer through an existing block data transfer interface.

Thus, it is appreciated that existing block data transfer interfaces can be CPU intensive and power intensive. Moreover, resources such as block aperture region resources utilized by a central processing unit to transfer data may be limited in number. Thus, if the number of CPU threads outnumber the number of block aperture region resources, performance may be impacted. Although various techniques such as resource locks may be utilized to manage allocation of limited resources, it is appreciated that such resource management can add significantly to the complexity of the hardware and software of the system.

In one aspect of the present description, a block data transfer interface having an offload data transfer engine is employed in a system of one or more computers configured to perform particular operations or actions of the block data transfer interface including an offload data transfer engine, by virtue of having software, firmware, hardware, or a combination of them installed on the system that in operation causes or cause the system to perform the actions. One or more computer programs can be configured to perform particular operations or actions of a block data transfer interface having an offload data transfer engine, by virtue of including instructions that, when executed by data processing apparatus, cause the apparatus to perform the actions.

Other embodiments include corresponding computer systems, apparatus, and computer programs recorded on one or more computer storage devices, each configured to perform the actions of the methods. Implementations of the described techniques may include hardware, a method or process, or computer software on a computer-accessible medium.

It is appreciated that a block data transfer interface employing an offload data transfer engine in accordance with the present description may be applied to a variety of host, storage and other memory devices such as for example, magnetic and optical disk drives, and solid state memory devices that use chalcogenide phase change material (e.g., chalcogenide glass), three-dimensional (3D) crosspoint memory, or memory that incorporates memristor technology. Additional memory devices which may benefit from a block data transfer interface employing offload data transfer engine in accordance with the present description may include other types of byte-addressable, write-in-place non-volatile memory, ferroelectric transistor random-access memory (FeTRAM), nanowire-based non-volatile memory, Magnetoresistive random-access memory (MRAM), Spin Transfer Torque (STT)-MRAM, Phase Change Memory (PCM), storage class memory (SCM), universal memory, Ge2Sb2Te5, programmable metallization cell (PMC), resistive memory (RRAM), RESET (amorphous) cell, SET (crystalline) cell, PCME, Ovshinsky memory, ferroelectric memory (also known as polymer memory and poly(N-vinylcarbazole)), ferromagnetic memory (also known as Spintronics, SPRAM (spin-transfer torque RAM)), STRAM (spin tunneling RAM), magnetic memory, magnetic random access memory (MRAM), and Semiconductor-oxide-nitride-oxidesemiconductor (SONOS, also known as dielectric memory). It is appreciated that other types of memory may benefit from a block data transfer interface employing offload data transfer engine in accordance with the present description, depending upon the particular application.

Turning to the figures, FIG. 1 is a high-level block diagram illustrating selected aspects of a computing system implemented according to an embodiment of the present disclosure. System 10 may represent any of a number of electronic or other computing devices, that may include a memory device. Such electronic devices may include a cloud storage system and other computing devices such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, memory, etc.). System 10 can be powered by a battery, renewable power source (e.g., solar panel), wireless charging, or by use of an AC outlet.

In alternative embodiments, system 10 may include more elements, fewer elements, and/or different elements. Moreover, although system 10 may be depicted as comprising separate elements, it will be appreciated that such elements may be integrated on to one platform, such as systems on a chip (SoCs). In the illustrative example, system 10 comprises a central processing unit or microprocessor 20, a memory controller 30, a memory 40, an offload data transfer engine 44, and peripheral components 50 which may include, for example, video controller, input device, output device, storage, network adapter, a power source (including a battery, renewable power source (e.g., photovoltaic panel), wireless charging, or coupling to an AC outlet), etc. The microprocessor 20 includes a cache 25 that may be part of a memory hierarchy to store instructions and data, and the system memory 40 may also be part of the memory hierarchy. The microprocessor 20 further includes logic 27 which may include one or more cores, for example. Communication between the microprocessor 20 and the memory 40 may be facilitated by the memory controller (or chipset) 30, which may also facilitate in communicating with the peripheral components 50.

Peripheral components 50 which are storage devices may be, for example, non-volatile storage, such as solid-state drives (SSD), magnetic disk drives including redundant arrays of independent disks (RAID), optical disk drives, a tape drive, flash memory, etc. The storage may comprise an internal storage device or an attached or network accessible storage. The microprocessor 20 is configured to write data in and read data from the memory 40. Programs in the storage are loaded into the memory and executed by the processor. The offload data transfer engine 44 facilitates memory to memory data transfers which bypass the microprocessor to lessen the load of such transfers on the microprocessor 20. As explained in greater detail below, one embodiment of a block data transfer interface in accordance with the present description, employs an offload data transfer engine such as the engine 44 to overcome or ameliorate resource limitations and improve performance for block data transfers.

A network controller or adapter enables communication with a network, such as an Ethernet, a Fibre Channel Arbitrated Loop, etc. Further, the architecture may, in certain embodiments, include a video controller configured to display information represented by data in a memory on a display monitor, where the video controller may be embodied on a video card or integrated on integrated circuit components mounted on a motherboard or other substrate. An input device is used to provide user input to the processor, and may include a keyboard, mouse, pen-stylus, microphone, touch sensitive display screen, input pins, sockets, or any other activation or input mechanism known in the art. An output device is capable of rendering information transmitted from the processor, or other component, such as a display monitor, printer, storage, output pins, sockets, etc. The network adapter may embodied on a network card, such as a Peripheral Component Interconnect (PCI) card, PCI-express, or some other I/O card, or on integrated circuit components mounted on a motherboard or other substrate. The peripheral devices 50 may also include RF receiver/transmitters such as in a mobile telephone embodiment, for example. Additional examples of peripheral devices 50 which may be provided in the system include an audio device and temperature sensor to deliver temperature updates for storage in the memory.

One or more of the components of the device 10 may be omitted, depending upon the particular application. For example, a network router may lack a video controller, for example.

Any one or more of the memory devices 25, 40, and the other devices 10, 30, 50 may include a memory employing a block data transfer interface employing offload data transfer engine in accordance with the present description, or be embodied as any type of data storage capable of storing data in a persistent manner (even if power is interrupted to non-volatile memory) such as but not limited to any combination of memory devices that use for example, chalcogenide phase change material (e.g., chalcogenide glass), three-dimensional (3D) crosspoint memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM) or another Spin Transfer Torque (STT)-MRAM as described above. Such memory elements in accordance with embodiments described herein can be used either in stand-alone memory circuits or logic arrays, or can be embedded in microprocessors and/or digital signal processors (DSPs). Additionally, it is noted that although systems and processes are described herein primarily with reference to microprocessor based systems in the illustrative examples, it will be appreciated that in view of the disclosure herein, certain aspects, architectures, and principles of the disclosure are equally applicable to other types of device memory and logic devices.

Figures 2A, 2B, 2C:
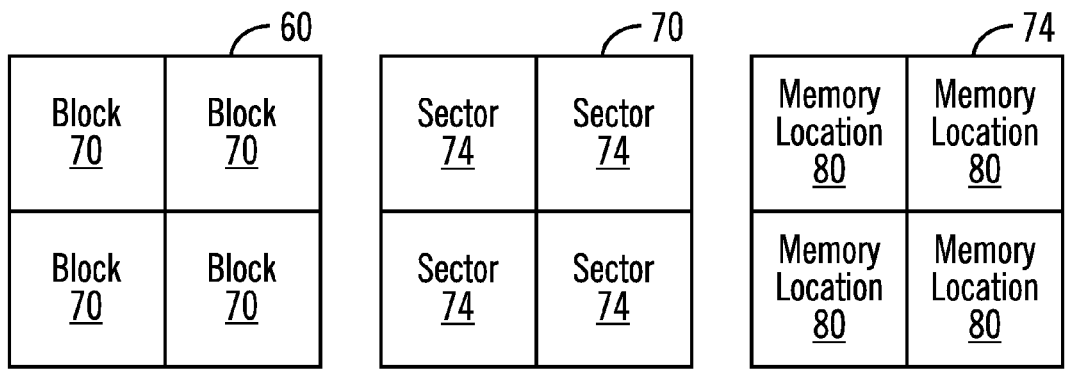
FIGS. 2a-2c depict various hierarchical levels of data storage of the memory of FIG. 1.

One or more of the memory 40 and storage devices of the peripheral devices 50 may have a rectangular or orthogonal array of rows and columns of cells such as bit cells in which each bit cell is configured to store a bit state. An array of bit cells may be logically subdivided in an array 60 of blocks 70 (FIG. 2a). Depending upon the size of the memory, the array of bit cells may have tens, hundreds, thousands, or more of such blocks 70. In one embodiment, the memory 40 or storage device of the devices 50 may include a non-volatile memory such as a flash memory, for example, in which each block 70 represents the smallest subunit of the memory which may be erased at one time.

Each block 70 may in turn be subdivided into an array of sectors 74 (FIG. 2b). Depending upon the size of the memory, a block 70 of sectors 74 may have a single sector or tens, hundreds, thousands, or more of such sectors 74. Each sector 74 may in turn be subdivided into an array of memory locations 80 (FIG. 2c). Depending upon the size of the memory, a sector 74 of memory locations 80 may have tens, hundreds, thousands, or more of such memory locations 80. One specific example of a sector is sized sufficiently to store 512 bytes of data. Each memory location includes one or more bit cells to store a bit, a byte, a word or other subunit of data, depending upon the particular application. Although a block data transfer interface in accordance with the present description is described in connection with storing data in a block of one or more sectors, it is appreciated that other units of data storage such as pages, tracks, segments, files, volumes, disks, drives, etc., may be utilized, depending upon the particular application.

A block data transfer interface in accordance with one embodiment includes a direct memory access (DMA) engine that transfers data to persistent memory in atomic units. Within a configurable unit boundary, typically represented as a sector in a storage device, user agents of the block data transfer interface can rely upon interrupted transfers completing in full or not at all within a given atomic sub-unit of the total transfer.

Figure 3:
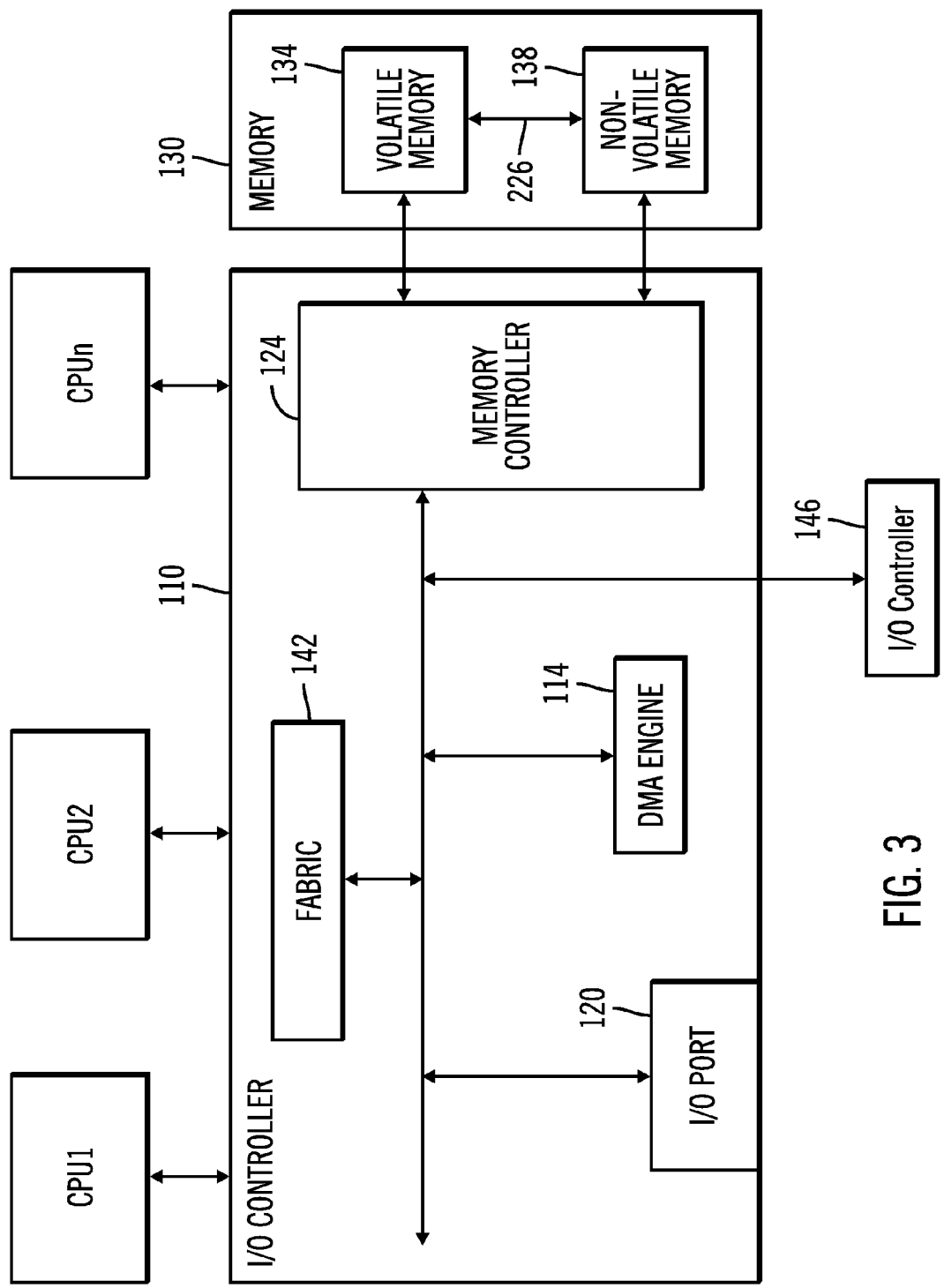
FIG. 3 depicts an embodiment of an input/output controller employing an offload data transfer engine for a block data transfer interface in accordance with the present description.

FIG. 3 is a high-level block diagram illustrating selected aspects of another embodiment of a computing system implementing a block data transfer interface in accordance with the present description. In this embodiment, the computing system includes a plurality of central processing units CPU1, CPU2, . . . CPUn, each of which may include a core processor, and an input/output (I/O) controller 110 which may include a bridge, for example. The central processing units CPU1, CPU2, . . . CPUn, and the input/output (I/O) controller 110 may be fabricated on a single die or on separate dies, depending upon the particular application. In this example, the I/O controller 110 includes an offload data transfer engine implemented as a direct memory access (DMA) controller or engine 114. A block transfer interface in accordance with one embodiment of the present description, employs the DMA engine 114 to improve block transfer operations as described in greater detail below.

In this embodiment, the I/O controller 110 further includes an I/O port 120, such as a PCIe (PCI-express) port, and a memory controller 124 directing memory operations to and from a memory 130 which includes a volatile memory 134 and a non-volatile memory 138 in this embodiment. A fabric 142 includes switches and data paths to inter-connect the internal components of the I/O controller 110 to each other and to external components such as the central processing units CPU1, CPU2 . . . CPUn, the memories 130, 134, 138 and other external components such as additional I/O controller 146. It is appreciated that a block data transfer interface in accordance with the present description, may utilize other computer architectures, depending upon the particular application.

Figure 4:
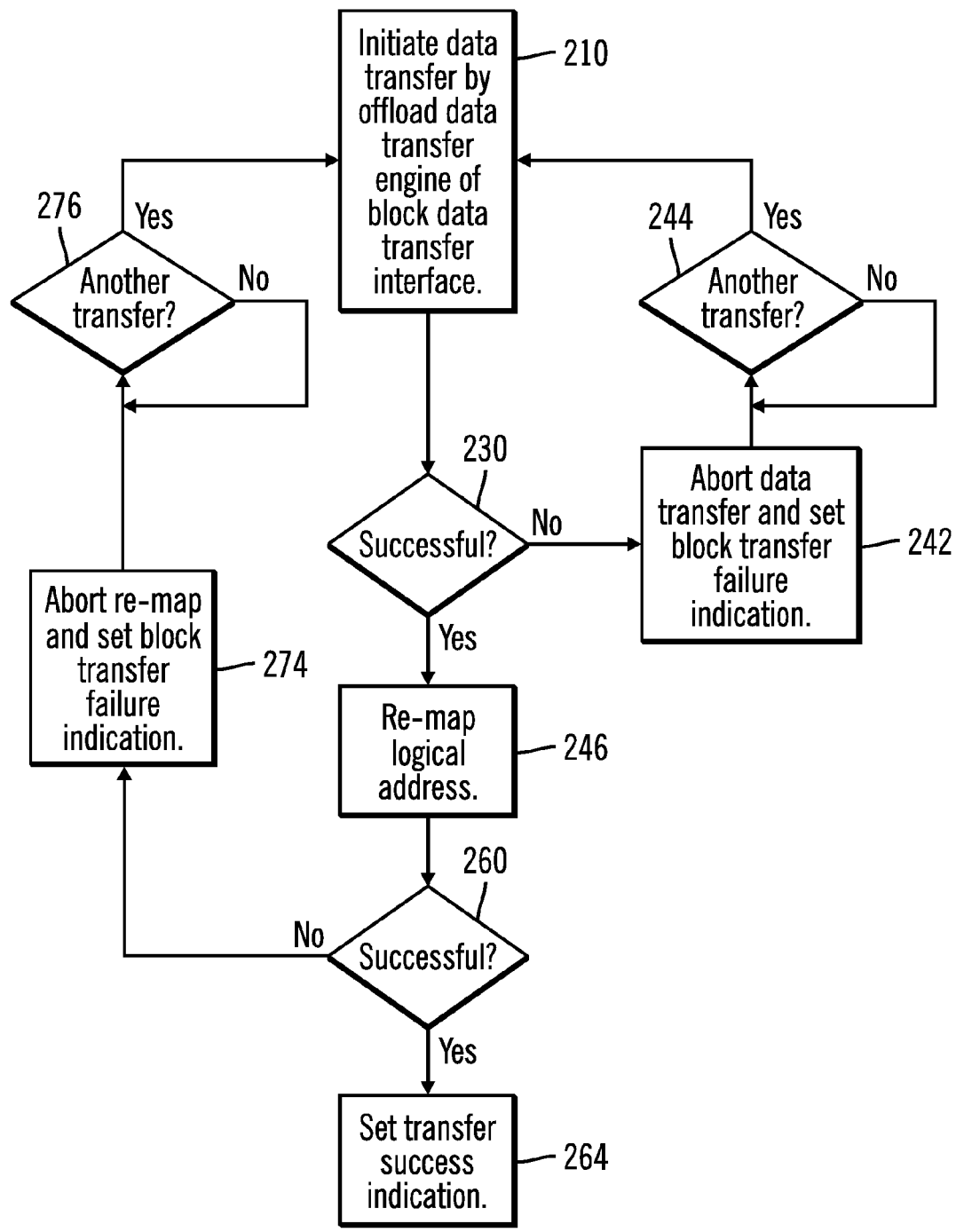
FIG. 4 depicts an embodiment of operations of a block data transfer interface employing an offload data transfer engine in accordance with the present description.
Figure 5:
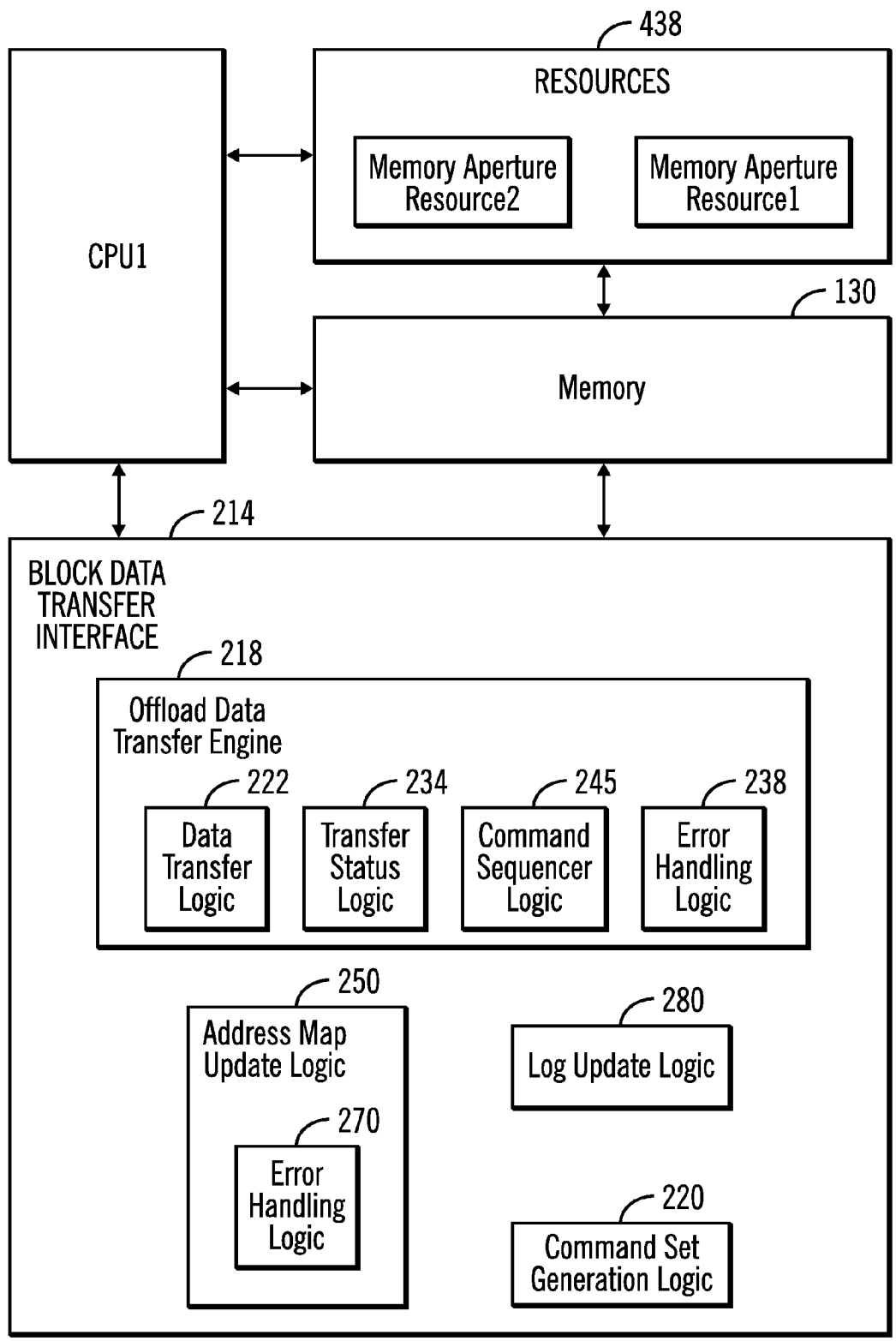
FIG. 5 depicts an embodiment of a block data transfer interface employing an offload data transfer engine in accordance with the present description.

FIG. 4 depicts one example of operations of a block data transfer interface employing an offload data transfer engine, in accordance with the present description. The transfer of a block of data is initiated (block 210, FIG. 4) by a logic element such as a central processing unit invoking the offload data transfer engine of the block data transfer interface. FIG. 5 depicts one example of a more detailed embodiment of a block data transfer interface 214 employing an offload data transfer engine 218 such as the DMA engine 114 of FIG. 3. It is appreciated that the operations of FIG. 4 may be performed by a block data transfer interface having architectures other than that depicted in FIG. 5 and employing other types of offload data transfer engines and other types of logic components.

The offload data transfer engine 218 is configured to execute a data transfer command set generated by command set generation logic 220. In one embodiment, the command set generation logic may be implemented by a central processing unit such as the CPU1, for example, executing a driver of the offload data transfer engine 218.

The offload data transfer engine 218 includes data transfer logic 222 which is configured to be responsive to at least one command of the data transfer command set, to transfer the block of update data in a transfer data path from a source memory to a region of the destination memory bypassing the central processing unit. FIG. 3 illustrates an example of a data path 226 from a memory 134 to a memory 138. Thus, the block of update data may be initially stored in the memory 134 such that the memory 134 is the source memory in this example. The block of update data is to be transferred to a destination memory such as the memory 138, for example, along a data path such as the data path 226.

In one aspect of the present description, the data path such as data path 226, may bypass the central processing units to minimize the involvement of the central processing units in the data transferred being effected by the offload data transfer engine 218. For example, the data transfer logic 222 transfers the block of data independently of block aperture region resource region resources and other resources of a central processing unit which may be limited in number. Accordingly, large amounts of data may be transferred without being limited by a shortage of central processing unit resources. In addition, if the data being transferred happens to be corrupted (often referred to as "poisoned data"), the corrupted data does not pass through the central processing unit. As a result, occurrences of a machine check, stoppage or shut down of the central processing unit due to the ingestion of poisoned data in a block data transfer, may be reduced or eliminated.

A determination is made (block 230, FIG. 4) as to whether the transfer of the block of update data to the destination memory block region was successful. In one embodiment, the offload data transfer engine 218 of the block data transfer interface 214 includes transfer status logic 234 configured to be responsive to at least one command of the data transfer command set to confirm successful transfer of the block of update data, and to provide a successful transfer indication of successful transfer of the block of update data to the destination memory block region. Conversely if any portion of the transfer of the block of update data to the destination memory block region was unsuccessful, the offload data transfer engine 218 further includes error handling logic 238 (FIG. 5) configured to, in response to the data transfer command set, to detect an error in transferring data from the source memory to the destination memory, and in response to error detection, stop or abort (block 242, FIG. 4) execution of the data transfer command set including the transfer of the update data of the block transfer from the source memory to the destination memory. In addition, the error handling logic 238 (FIG. 5) is further configured to provide a block transfer failure indication of unsuccessful transfer of data to the destination memory. In this manner, error handling and data transfer offload may be unified in the offload data transfer engine 218 in contrast to data transfer and error checking operations being handled separately by a programmed CPU alone or in combination with other devices. Further, the offload data transfer engine 218 can be configured to use sideband information to confirm persistence in contrast to a programmed CPU undertaking serialized operations and stalling actions to confirm persistence of the data. Still further, the offload data transfer engine 218 can be configured to integrate transformations and optimizations in the data path. For example, the offload data transfer engine 218 can be configured to transparently insert data integrity field (DIF) generation and checking in the data path of the data transfer. If it is determined (block 244, FIG. 4) that other block transfers are to be initiated, the operations proceed again as described above.

In one embodiment, a data transfer command set may include more than one data transfer command or descriptor. Accordingly, in one embodiment, the offload data transfer engine 218 includes command sequencer logic 245 configured to fetch each command or descriptor of the data transfer command set in sequence for execution by the offload data transfer engine 218.

If it is determined (block 230, FIG. 4) that the transfer of the block of update data to the destination memory block region was successful, the logical address is re-mapped (block 246). Accordingly, the block data transfer interface 214 includes address map update logic 250 (FIG. 5), configured to be responsive to the successful transfer indication provided by the transfer status logic 234, to re-map the logical address to a physical address of the new region of the destination memory containing the transferred block of update data, instead of the physical address of the original region of the destination memory containing the original or not updated data.

For example, an address map data structure may include a block transfer table comprising entries wherein each block a block transfer table entry is configured to map a logical address to one or more physical addresses of the destination memory. Thus, the address map update logic 250 may be further configured to be responsive to the successful transfer indication provided by the transfer status logic 234, to update a block transfer table entry to re-map the logical address to a physical address of the new region of the destination memory containing the transferred block of update data, instead of to the physical address of the original memory region containing the original or not updated data.

A determination is made (block 260, FIG. 4) as to whether the re-map of the logical address to a physical address of the new memory block region containing the transferred block of update data was successful. In one embodiment, the address map update logic 250, is further configured to confirm (block 260, FIG. 4) successful re-mapping of the logical address, and to provide (block 264, FIG. 4) a successful transfer indication of successful transfer of the block of update data to the destination memory block region. Because both the transfer of the block of data to the new memory block region and the re-mapping of the logical address to the new memory block region were successful, subsequent read operations will return the updated data stored in the new memory block region.

Conversely if the re-map of the logical address was unsuccessful (block 260, FIG. 4), the address map update logic 250 further includes error handling logic 270 configured to detect an error in updating the address map to re-map the logical address to the new memory block region of the destination memory. If so, the updating of the address map is aborted (block 274). In addition, the error handling logic 270 of the address map update logic 250 (FIG. 5) is further configured to provide a block transfer failure indication of unsuccessful transfer of data to the destination memory. Accordingly, if either the transfer of the block of data to the new memory block region was unsuccessful (block 230, FIG. 4) or the re-mapping of the logical address to the new memory block region was unsuccessful (block 260), the error handling logic 270 leaves the mapping of the logical address to the physical address (or addresses) of the original region of the destination memory unchanged. Thus, subsequent read operations will return the original data stored in the original memory block region. As a result, the effect is as if no portion of the block transfer was undertaken. If it is determined (block 276, FIG. 4) that other block transfers are to be initiated, the operations proceed again as described above.

As discussed in greater detail below, the block data transfer interface 214 further includes, in one embodiment, a log update logic 280 configured to update an entry of a free region log data structure to indicate that the original region is available for use to store other data, after the logical address is re-mapped to the new region of the destination memory. The logic components discussed herein including the logic elements 218, 220, 222, 234, 238, 245, 250, 270, 280 may be configured to perform the described operations using appropriate hardware, software or firmware, or various combinations thereof. The software may be in the form of programs, drivers and other instruction sets, and the hardware may be in the form of general purpose logic devices such as microprocessors or specific purpose logic devices such as a DMA controller or engine or ASIC device, for example.

The hardware, software or firmware of the block transfer interface 214 may be physically or logically located in any component of the system including the memory itself, a controller such as a memory controller, DMA controller, a microprocessor, etc. Thus, in one embodiment, one or more of the logic elements 220, 250, 280, for example, may be implemented with one or more of hardware of the offload data transfer engine 218, firmware for the offload data transfer engine 218 and software such as associated driver software of the offload data transfer engine 218. In another embodiment, one or more of the logic elements 220, 250, 280 may be implemented with one or more of controller hardware such as the central processing unit CPU1, for example, or other controller, firmware for the controller hardware and software for the controller hardware such as programs and drivers executed by the controller hardware such as the central processing unit CPU1, for example. In another embodiment, one or more of the logic elements 220, 250, 280 may be implemented with hardware, firmware or software for both an offload data transfer engine and a central processing unit, for example.

Figures 6A, 6B:
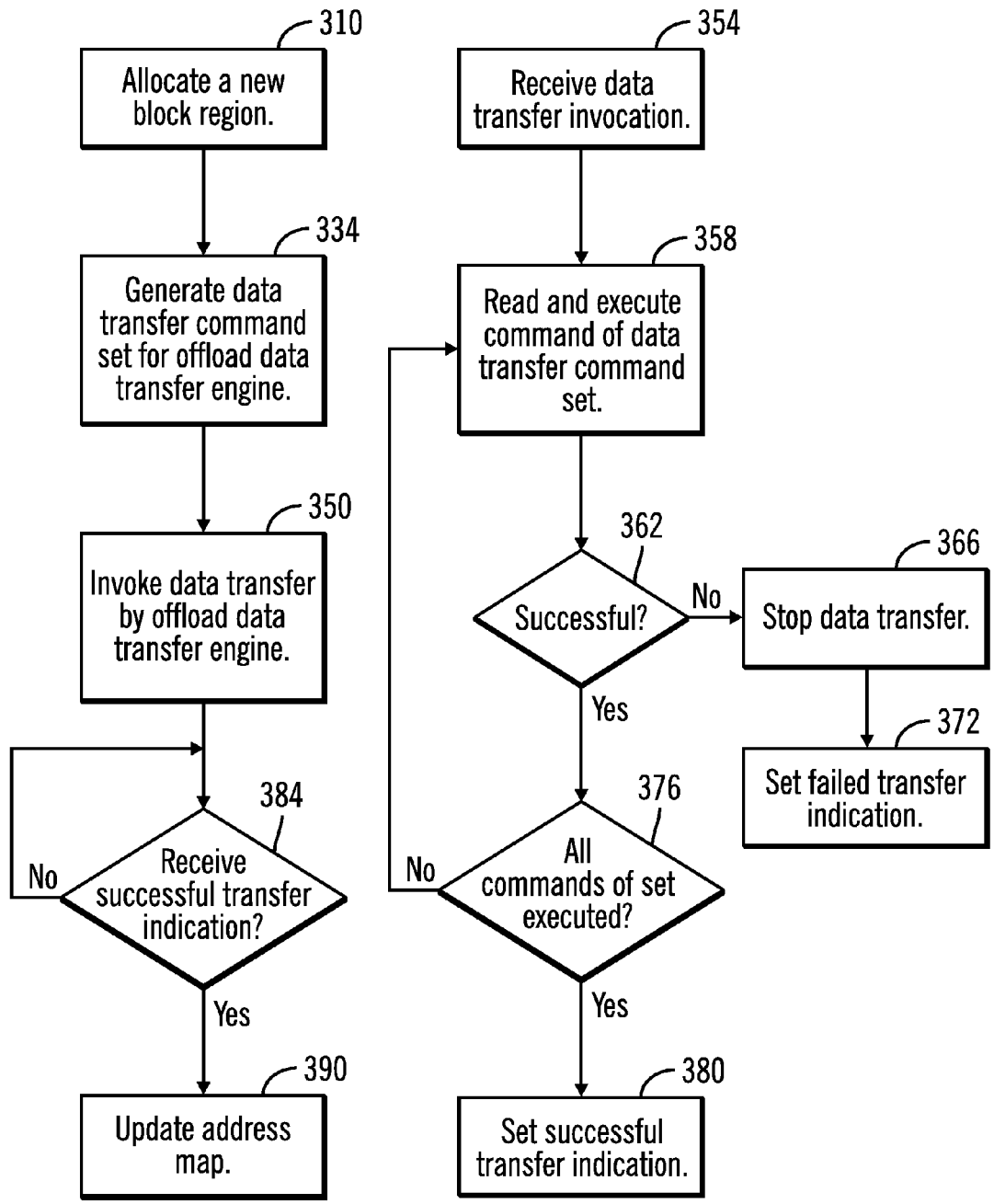
FIGS. 6a, 6b depict another embodiment of operations of a block data transfer interface employing an offload data transfer engine in accordance with the present description.

FIG. 6a depicts one example of operations of a central processing unit such as the central processing unit CPU1 in invoking an offload data transfer engine 218 to perform the data transfer operations of a block transfer interface 214. In one operation, the central processing unit allocates (block 310, FIG. 6a) a new block region of the destination memory. FIG. 7a shows an example of a destination memory 314 having a first memory block region 318 which contains the original block of data before updating, and a second memory block region 322 which is the newly allocated memory block region to receive the block of update data. The destination memory 314 may be a non-volatile memory of the non-volatile memory 138 (FIG. 3), for example. It is appreciated that the destination memory 314 may be other types of memory and may be located at various locations within the computing system, depending upon the particular application.

In allocating the new memory block region 322, the central processing unit may provide various allocation parameters such as a destination address represented by the address variable D, and the length of the block region in bytes as represented by the length variable L, such that the new block region 322 can accommodate the entire contents to be transferred from the source region. FIG. 7b depicts an example of such a source region as represented by a source data region 326 (FIG. 7b) of a buffer of a source memory 330. The source memory 330 may be a volatile memory of the volatile memory 134 (FIG. 3), for example. It is appreciated that the source memory 330 may be other types of memory and may be located at various locations within the computing system, depending upon the particular application.

In this example of FIG. 6a, the central processing unit also generates (block 334, FIG. 6a) a set of data transfer commands to instruct the offload transfer engine 218 of the block data transfer interface 214, to perform the actual transfer of the block of update data from the source region 326 (FIG. 7a) to the newly allocated destination block region 322 (FIG. 7b). In one embodiment, the command set generation logic 220 (FIG. 5) is implemented by a central processing unit executing a driver of the offload transfer engine to generate the data transfer command set.

FIG. 7c depicts an example of a data transfer command set 338 which has been generated and stored in a command set memory 342 to be accessed by the offload data transfer engine 218 of the block data transfer interface 214. The command set memory 342 may be a set of registers of the offload data transfer engine 218 of the block data transfer interface 214 (FIG. 3), for example. In some offload data transfer engines, such a set of registers for storing descriptors is referred to as a circular descriptor ring.

It is appreciated that the command set memory 342 may be other types of memory and may be located at various locations within the computing system, depending upon the particular application.

In one embodiment, a command of the data transfer command set 338 may be in the form of a descriptor which includes various data transfer parameters such as an operation code (opcode), a source address S of the update data to be transferred, a transfer length L of the update data to be transferred, and a destination address D identifying the location to which the update data is to be transferred by the offload data transfer engine 218 of the block data transfer interface 214 (FIG. 3). One example of an operation code suitable for a data transfer by an offload data transfer engine is the DMA opcode DMACOPY.

It is appreciated that a descriptor of the data transfer command set 338 may be utilized to cause the offload data transfer engine 218 to transfer a block of update data from an identified source region to an identified destination region. However, in some embodiments, a single descriptor may be utilized to transfer more than one block of data by specifying an appropriate length L of data to be transferred, and allocating a sufficiently large destination region. Moreover, the data transfer command set 338 may be utilized to transfer multiple blocks of data from multiple source regions to multiple destination regions. For example, the data transfer command set 338 may include a chain of multiple descriptors, each descriptor identifying a source region, a length of data to be transferred and a destination memory region to which data is to be transferred. Accordingly, the central processing unit may allocate (block 310, FIG. 6a) more than one destination region for a particular data transfer command set 338 generated (block 334, FIG. 6a) by the central processing unit.

Having allocated (block 310, FIG. 6a) an appropriate number of destination memory regions, and generated (block 334, FIG. 6a) an appropriate data transfer command set, the central processing unit invokes (block 350, FIG. 6a) the offload data transfer engine 218 to transfer the update data in the manner specified by the data transfer command set. In one embodiment, the offload data transfer engine 218 may be invoked by the central processing unit by providing a start address of the data transfer command set which identifies the first descriptor of the data transfer command set. Such a start address may be stored in a suitable register of the offload data transfer engine 218. In one known DMA engine, a start address of a chain of descriptors to be executed by the DMA engine is referred to as the "CHAINADDR" register in the memory-to-memory input/out (MMIO) space.

In addition, the central processing unit may instruct the offload data transfer engine 218 as to the number of descriptors or commands in the data transfer command set invoking the offload data transfer engine 218. In one known DMA engine, a count of descriptors in a command set may be stored in a suitable register referred to as "DMACOUNT" in the MMIO space.

FIG. 6b illustrates an example of operations of an offload data transfer engine such as the engine 218, to transfer data as instructed by a data transfer command set provided by the central processing unit. The offload data transfer engine receives (block 354, FIG. 6b) the data transfer invocation from the central processing unit, reads (block 358, FIG. 6b) and executes the starting command or descriptor of the data transfer command set. Accordingly, the offload data transfer engine transfers the length of data specified by the descriptor, from the source memory region specified by the descriptor, to the destination memory region specified by the descriptor. In one embodiment, the data transfer is a byte aligned transfer. However, it is appreciated that other transfer modes may be employed, depending upon the particular application.

A determination is made (block 362, FIG. 6b) as to whether the transfer of the block of update data to the destination memory block region was successful. As previously mentioned, in one embodiment, the offload data transfer engine 218 of the block data transfer interface 214 includes transfer status logic 234 configured to be responsive to the descriptor being executed to confirm successful transfer of the block of update data. If any portion of the transfer of the block of update data to the destination memory block region was unsuccessful, error handling logic 238 (FIG. 5) of the offload data transfer engine 218 is configured to, in response to the data transfer descriptor being executed, to detect an error in transferring data from the source memory to the destination memory, and in response to error detection, stop or abort (block 366, FIG. 6b) the transfer of the update data of the block transfer from the source memory to the destination memory. In addition, the error handling logic 238 (FIG. 5) is further configured to provide (block 372, FIG. 6b) a failed transfer indication of unsuccessful transfer of data to the destination memory. Accordingly, the execution of the remaining descriptors of the data transfer command set is terminated.

For example, if the offload data transfer engine encounters poisoned data, it will stop the transfer of data. An example of such poisoned data includes an uncorrectable error returned with a memory read or an internal buffer parity error during the memory operation. An offload data transfer engine frequently has extensive error handling capabilities such as those based upon the Peripheral Component Interconnect Express (PCIe) protocol (https://pcisig.com/specifications/pciexpress/), for example, and in one embodiment, will halt the engine immediately to indicate failure due to poison. Further, an entry may be recorded in an associated error log and status updates and/or interrupts (such as non-maskable interrupts (NMI), system management interrupts (SMI) or system control interrupts (SCI) for example) may be sent to the host central processing unit. Such interrupts can invoke machine check routines, for example, for error analysis without process corruption. Thus, instances of silent data corruption may be reduced or eliminated.

Conversely, if it is determined (block 362, FIG. 6b) that the transfer of the block of update data to the destination memory block region was successful, the count of descriptors of the data transfer command set remaining to be executed is decremented and a determination (block 376, FIG. 6b) is made as to whether there are commands or descriptors of the data transfer command set remaining to be executed. If there are commands remaining to be executed, the next-in-sequence descriptor of the chain of descriptors of the data transfer command set is fetched, read (block 358, FIG. 6b) and executed in the manner described above. In one embodiment, the offload data transfer engine 218 includes command sequencer logic 245 which increments an address to the chain of descriptors to point to the next-in-sequence descriptor of the data transfer command set to be executed. Thus, an address stored in a register such as the "CHAIN-ADDR" register in the memory-to-memory input/out (MMIO) space may be incremented to point to the next descriptor in the chain.

Once all commands or descriptors of the data transfer command set have been successfully executed as confirmed by the transfer status logic 234 (FIG. 5) of the offload data transfer engine 218, the transfer of the update data to the destination memory is complete. Accordingly, a successful transfer indication may be set (block 380, FIG. 6b) by the offload data transfer engine, to signal to the central processing unit that the data transfer was successful. For example, a status register may be set to signal a completion status update or an interrupt may be sent to the central processing unit, or both. Upon receipt (block 384, FIG. 6b) of the indication of a successful transfer of the update data to the destination memory, an address map such as a block transfer table, for example, may be updated (block 390, FIG. 6a) by address map update logic 250 (FIG. 5) to re-map the logical address to the new memory region containing the update data. FIG. 7d shows an example of an address map 392 stored as a data structure in a data structure memory 394 configured to store data structures such as the address map 392.

In addition, the original memory region containing the original (un-updated) data is no longer needed and may be marked as available space to store other data. The data structure memory 394 is further configured to store a free region log as a data structure 396 having entries to indicate free regions of the destination memory. Following successful completion of the transfer of the update data to the destination memory, and the successful completion of the updating of the address map, the free region log may be updated by log update logic 280 (FIG. 5) to indicate that the original memory region containing the original (non-updated) data, is available to store other data.

It is appreciated that a block data transfer interface employing an offload data transfer engine as described herein for transfer of data to a destination memory can significantly improve performance of a computing system. For example, after invoking the offload data transfer engine as described above, the transfer of update data may be achieved with no further involvement of the central processing unit. In one embodiment, the offload data transfer engine may be invoked with a single "doorbell ring" which makes a data transfer command set available to the offload data transfer engine to execute. Accordingly, the central processing unit is freed to perform other tasks while the offload data transfer engine of the block data transfer interface, transfers the data and ensures that the data was successfully transferred. For example, status checks are performed by the offload data transfer engine as a part of the execution of the descriptors of the provided data transfer command set. In some embodiments, a status check to confirm a successful data transfer may be a normal memory read. Furthermore, if the central processing unit allocates DMA flows, the status check read may be a cache hit, further increasing performance. Moreover, the offload data transfer engine can frequently accomplish a transfer of a block of data consuming significantly lower amounts of power as compared to that consumed by a central processing unit transferring a similar block of data.

FIG. 8 illustrates one example of the address map update logic 250 implemented as a central processing unit such as the central processing unit CPU1, for example, updating an address map such as a block transfer table (BTT), for example, to re-map the logical address to the new memory region containing the update data. In this example, the address map update logic 250 (FIG. 5) is further configured to acquire a block aperture region resource, program the block aperture region resource to point to an entry of the block transfer table. The address map update logic 250 is further configured to perform an atomic write to the update entry so that the logical address previously mapped to the original memory region, will be mapped to the physical address of the new region of the destination memory containing the update data. In this manner, the central processing unit may perform operations to update a block transfer table entry, following the successful transfer (block 434, FIG. 8) of the update data to the destination memory by the offload data transfer engine as described above in connection with FIGS. 6a, 6b.

Accordingly, in this example, the central processing unit CPU1 acquires (block 436, FIG. 8) a block aperture region resource such as the block aperture region resource1 (FIG. 5) of resource 438 available to the central processing unit CPU1, and programs the acquired block aperture region resource to point to a new entry of the block transfer table (BTT). As previously mentioned, a block aperture region resource programming operation is typically an un-cached (UC) write operation by the central processing unit. To update the block transfer table, an atomic write (block 440) is performed by the central processing unit to update the block transfer table to map the logical address which was previously mapped to the original block region containing the original data, to the new memory region now containing the new block of update data. To ensure that the block transfer table was successfully updated, the central processing unit, in another un-cached read operation, checks (block 444) the status of atomic write operation in another read operation which is again, typically an un-cached read operation.

Figures 9A, 9B:
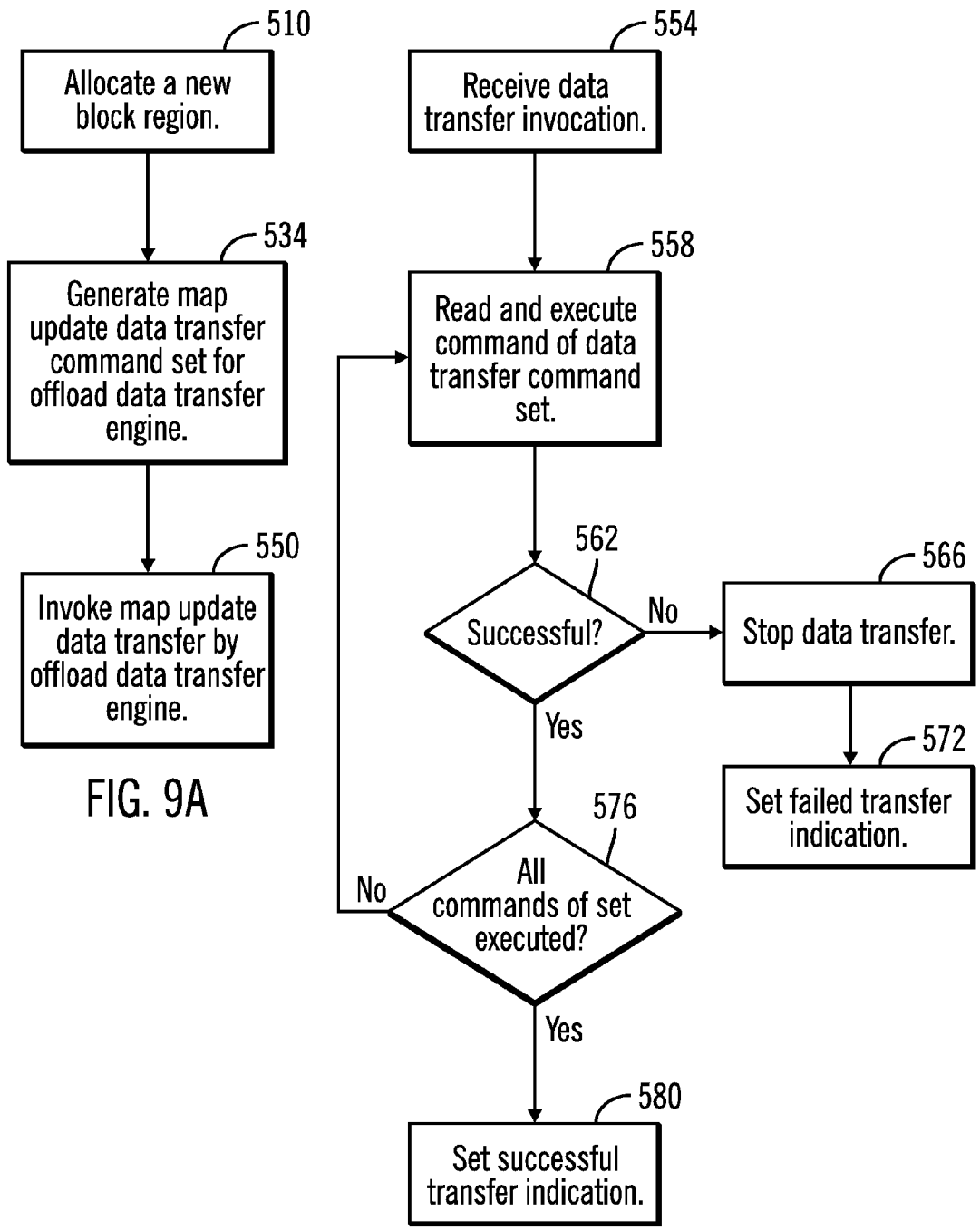
FIGS. 9a, 9b depict another embodiment of operations of a block data transfer interface employing an offload data transfer engine in accordance with the present description.

FIGS. 9a, 9b are directed to another embodiment in which a central processing unit such as the central processing unit CPU1 (FIG. 5) invokes an offload data transfer engine 218 to not only perform the transfer of the update data to the destination memory, but also to perform an address map update operation, and a free region log update. As a result, the use of block aperture region resources in the block data transfer interface may be obviated, to provide an increase in system performance and a reduction in system complexity in some embodiments. For example, areas of a CPU die dedicated to providing block aperture resource areas may be reduced or eliminated, freeing CPU die space for other purposes. Moreover, a DMA engine such as the offload data transfer engine 218 can permit overlapping command submissions without the contention over a limited number of block aperture resources. Thus, a block data transfer interface employing an offload data transfer engine as described herein can more readily scale up as data transfer needs increase as compared to systems relying upon a limited number of block aperture resources.

Accordingly, in this embodiment, at least a portion of the address map update logic 250 is disposed within the offload data transfer engine 218 (FIG. 5). In addition, the data transfer command set includes at least one address map update data transfer command from a central processing unit to the offload data transfer engine, to initiate a transfer of address map update entry data by the offload data transfer engine, from a source memory to a data structure memory. The address map update logic 250 is configured to be responsive to the address map update data transfer command, to transfer the address map update entry data from a source memory to a data structure memory so that the logical address is mapped to the physical address of the new region of the destination memory containing the successfully transferred update data.

Further, in this embodiment, at least a portion of the log update logic 280 is disposed within the offload data transfer engine 218 (FIG. 5). In addition, the data transfer command set includes at least one log update data transfer command from a central processing unit to the offload data transfer engine, to initiate a transfer of free region log update entry data by the offload data transfer engine, from a source memory to a data structure memory. The log update logic 280 is configured to be responsive to the log update data transfer command, to transfer the free region log update entry data from a source memory to a data structure memory so that the free region log indicates that the original region is available for use to store other data.

In a manner similar to that described above in connection with FIG. 6a, the central processing unit allocates (block 510, FIG. 9a) a new block region of the destination memory such as the memory block region 322 (FIG. 7a) to receive the block of update data. In allocating the new memory block region 322, the central processing unit may provide various allocation parameters such as a destination address represented by the address variable D, and the length of the block region in bytes as represented by the length variable L, such that the new block region 322 can accommodate the entire contents to be transferred from the source region.

In a manner similar to that described above in connection with FIG. 6a, the central processing unit generates (block 534, FIG. 9a) a data transfer command set 338 which includes one or more update data transfer commands 338a (FIG. 7e) to instruct the offload transfer engine 218 of the block data transfer interface 214, to perform the actual transfer of the block of update data from the source region 326 (FIG. 7a) to the newly allocated destination block region 322 (FIG. 7b). In this embodiment, a command of the data transfer command set 338 may be in the form of a descriptor which includes various data transfer parameters such as an operation code (opcode), a source address S of the update data to be transferred, a transfer length L of the update data to be transferred, and a destination address D identifying the location to which the update data is to be transferred by the offload data transfer engine 218 of the block data transfer interface 214 (FIG. 3).

In this embodiment, the descriptors of the data transfer command set 338 may also include at least one descriptor of a subset of address map update commands 338b such as map data transfer commands, to transfer map entry data to update an address map following successful transfer of the update data to the destination memory. The descriptors of the data transfer command set 338 may also include at least one descriptor of a subset of free log update commands 338c such as log data transfer commands, to transfer free region log data structure entry data to update a free region log following successful updating of the address map. The subset 338a of update data transfer commands, the subset 338b of address map update commands and the subset 338c of free log update commands may be chained together in a single data transfer command set 338 as depicted in FIG. 7e. As a result, the offload data transfer engine may be invoked in a single "doorbell" ring from the central processing unit to the offload data engine to accomplish the transfer of the update data to the destination memory, the updating of the address map and the updating of the free region log without further involvement of the central processing unit, while preserving atomicity of the block data transfer interface.

In addition to the data transfer parameters discussed above for transferring the update data, the data transfer command set may include various address map update and free region log update parameters provided by the central processing unit. For example, address map update parameters provided by the central processing unit to the offload data transfer engine, may include an offset value and a logical block address indicating where in the memory area storing the address map, the address map update entry is to be written by the offload data transfer engine. Similarly, free region log update parameters provided by the central processing unit to the offload data transfer engine, may include a sequence number for the new free region update entry, and an offset value indicating where in the memory area storing the free region log, the new free region log update entry is to be written by the offload data transfer engine.

The data transfer command set 338 may be stored in a command set memory 342 such as a set of registers of the offload data transfer engine 218 of the block data transfer interface 214 (FIG. 3), for example. As previously mentioned, in some offload data transfer engines, such a set of registers for storing descriptors is referred to as a circular descriptor ring.

Having allocated (block 510, FIG. 9a) an appropriate number of destination memory regions, and generated (block 534, FIG. 9a) an appropriate data transfer command set which includes chained subsets of data transfer, address map update and free region log update commands, the central processing unit invokes (block 550, FIG. 9a) the offload data transfer engine 218 to transfer the update data, update the address map and update the free region log in the manner specified by the data transfer command set. In a manner similar to that described above in connection with FIGS. 6a, 6b, the offload data transfer engine 218 may be invoked by the central processing unit by providing a start address of the data transfer command set which identifies the first descriptor of the data transfer command set. As previously mentioned, such a start address may be stored in a suitable register of the offload data transfer engine 218 such as the "CHAINADDR" register in the memory-to-memory input/out (MMIO) space, for example.

In addition, the central processing unit may instruct the offload data transfer engine 218 as to the number of descriptors or commands in the data transfer command set invoking the offload data transfer engine 218. As previously mentioned, in one known DMA engine, a count of descriptors in a command set may be stored in a register referred to as "DMACOUNT" in the MMIO space, for example.

FIG. 9b illustrates an example of operations of an offload data transfer engine such as the engine 218, to transfer data as instructed by a data transfer command set provided by the central processing unit. The offload data transfer engine receives (block 554, FIG. 9b) the data transfer invocation from the central processing unit, fetches, reads (block 558, FIG. 9b) and executes the starting command or descriptor of the data transfer command set. In this embodiment, the starting descriptor is a descriptor of the update data transfer commands subset 338a. Accordingly, the offload data transfer engine transfers the length of data specified by the descriptor, from the source memory region specified by the descriptor, to the destination memory region specified by the descriptor. In one embodiment, the data transfer is a byte aligned transfer. However, it is appreciated that other transfer modes may be employed, depending upon the particular application.

A determination is made (block 562, FIG. 9b) as to whether the transfer of the block of update data to the destination memory block region was successful. As previously mentioned, in one embodiment, the offload data transfer engine 218 of the block data transfer interface 214 includes transfer status logic 234 configured to be responsive to the descriptor being executed to confirm successful transfer of the block of update data. If any portion of the transfer of the block of update data to the destination memory block region was unsuccessful, error handling logic 238 (FIG. 5) of the offload data transfer engine 218 is configured to, in response to the data transfer descriptor being executed, to detect an error in transferring data from the source memory to the destination memory, and in response to error detection, stop or abort (block 566, FIG. 9b) the transfer of the update data of the block transfer from the source memory to the destination memory. In addition, the error handling logic 238 (FIG. 5) is further configured to provide (block 572, FIG. 6b) a failed transfer indication of unsuccessful transfer of data to the destination memory. Accordingly, the execution of the remaining descriptors of the data transfer command set is terminated.

Conversely, if it is determined (block 562, FIG. 9b) that the transfer of the block of update data to the destination memory block region was successful, the count of descriptors of the data transfer command set remaining to be executed is decremented and a determination (block 576, FIG. 9b) is made as to whether there are commands or descriptors of the data transfer command set remaining to be executed. If there are commands remaining to be executed, the next-in-sequence descriptor of the chain of descriptors of the data transfer command set is fetched, read (block 358, FIG. 6b) and executed in the manner described above. As previously mentioned, the offload data transfer engine 218 includes command sequencer logic 245 which increments an address to the chain of descriptors to point to the next-in-sequence descriptor of the data transfer command set to be executed. Thus, an address stored in a register such as the "CHAINADDR" register in the memory-to-memory input/out (MMIO) space may be incremented to point to the next descriptor in the chain.

In one embodiment, the update data transfer command subset 338a of the data transfer command set 338 includes one or more descriptors sufficient to cause the transfer of a single block of update data to the destination memory. In another embodiment, the update data transfer command subset 338a of the data transfer command set 338 includes one or more descriptors sufficient to cause the transfer of multiple blocks of update data to one or more destination regions of the destination memory, from one or more source regions of a source memory. Upon successful completion of the transfer of the block or blocks of update data, the command sequencer logic 245 has incremented an address to the chain of descriptors to point to a starting descriptor of the address map update commands subset 338b, which is the next-in-sequence descriptor of the data transfer command set to be executed.

Accordingly, the offload data transfer engine, in response to the descriptor or descriptors of the address map update commands subset 338b, reads the address map to obtain the existing logical address mapping to the physical address of the original memory region, and transfers data to the address map to write the new, updated address map entry which maps the logical address to the physical address of the new memory region containing the update data, instead of to the original region. This address map update operation may be performed for each block of data successfully transferred to the destination memory. In one embodiment, the address map or BTT region, for example, may be reserved in memory to limit access to the offload data transfer engine 218.

A determination is made (block 562, FIG. 9b) as to whether the transfer of the address map update data to the address map was successful. In one embodiment, the offload data transfer engine 218 of the block data transfer interface 214 includes transfer status logic 234 configured to be responsive to the descriptor being executed to confirm successful transfer of the address map update data to update the address map. If any portion of the transfer of the address map update data to the address map was unsuccessful, error handling logic 238 (FIG. 5) of the offload data transfer engine 218 is configured to, in response to the descriptor being executed, to detect an error in transferring address map update data to the address map, and in response to error detection, stop or abort (block 566, FIG. 9*b*) the transfer of address map update data to the address map. In addition, the error handling logic 238 (FIG. 5) is further configured to provide (block 572, FIG. 6*b*) a failed transfer indication of unsuccessful transfer of address map update data to the address map. Accordingly, the execution of the remaining descriptors of the data transfer command set is terminated.

Conversely, if it is determined (block 562, FIG. 9*b*) that the transfer of the address map update data to the address map was successful, the count of descriptors of the data transfer command set remaining to be executed is decremented and a determination (block 576, FIG. 6*b*) is made as to whether there are commands or descriptors of the data transfer command set remaining to be executed. If there are commands remaining to be executed, the next-in-sequence descriptor of the chain of descriptors of the data transfer command set is fetched, read (block 358, FIG. 6*b*) and executed in the manner described above.

Upon successful completion of the transfer of the address map update data to the address map, the command sequencer logic 245 has incremented an address to the chain of descriptors to point to a starting descriptor of the free region log update commands subset 338*c*, which is the next-in-sequence descriptor of the data transfer command set to be executed.

Accordingly, the offload data transfer engine, in response to the descriptor or descriptors of the free region log update commands subset 338*c*, composes a free region log entry using the logical block address of the block of data transferred, the prior address map entry for that block of data, the new address map entry for that block of data, and the supplied sequence number. The new free region log entry data composed by the offload data transfer engine is written to the free region log at the offset value supplied by the descriptor from the central processing unit, to update the free region log. In this manner, the free region log may be updated to indicate that the original memory block region of each successful data transfer, has been superseded by update data in a new memory block region and that each such original memory block region is now available to store other data. This free region log update operation may be performed for each block of data successfully transferred to a new memory block region of the destination memory.

A determination is made (block 562, FIG. 9*b*) as to whether the transfer of the free region log update data to the free region log was successful. In one embodiment, the offload data transfer engine 218 of the block data transfer interface 214 includes transfer status logic 234 configured to be responsive to the descriptor being executed to confirm successful transfer of the free region log update data to the free region log. If any portion of the transfer of the free region log update data to the free region log was unsuccessful, error handling logic 238 (FIG. 5) of the offload data transfer engine 218 is configured to, in one embodiment, in response to the descriptor being executed, to detect an error in transferring free region log update data to the free region log, and in response to error detection, stop or abort (block 566, FIG. 9*b*) the transfer of free region log update data to the free region log. In addition, the error handling logic 238 (FIG. 5) is further configured to, in one embodiment, to provide (block 572, FIG. 6*b*) a failed transfer indication of unsuccessful transfer of free region log update data to the free region log. Accordingly, the execution of the remaining descriptors of the data transfer command set is terminated.

Conversely, if it is determined (block 562, FIG. 9*b*) that the transfer of the free region log update data to the free region log was successful, the count of descriptors of the data transfer command set remaining to be executed is decremented and a determination (block 576, FIG. 6*b*) is made as to whether there are commands or descriptors of the data transfer command set remaining to be executed. If there are commands remaining to be executed, the next-in-sequence descriptor of the chain of descriptors of the data transfer command set is fetched, read (block 558, FIG. 6*b*) and executed in the manner described above. Otherwise, the successful transfer indication is set (block 580, FIG. 9*b*). For example, a status register may be set to signal a completion status update or an interrupt may be sent to the central processing unit, or both.

It is appreciated that a block data transfer interface in accordance with the present description can reduce or eliminate multiple un-cached read and write operations by a central processing unit which may be replaced with a single "doorbell" write to an offload data transfer engine. In response, the offload data transfer engine can perform the update data transfer independently of the central processing unit, and communicate to the central processing unit the successful data transfer after the data transfer has been completed. In the event of a power failure at any point in the operations by the offload data transfer engine, the address map will not be updated to prevent read operations to torn memory regions.

EXAMPLES

The following examples pertain to further embodiments.

Example 1 is a system, comprising: at least one central processing unit, a memory having a destination memory which includes a first destination region configured to store a first block of data, and a second destination region configured to store a second block of data, wherein the memory further has a data structure memory configured to store an address map data structure to map a first logical address to a first physical address of the first destination region, a source memory configured to store a block of update data to update data of the first block of data, and a command set memory configured to store a data transfer command set from a central processing unit, the data transfer command set including at least one data transfer command from a central processing unit to transfer a block of data, from the source memory to the destination memory, a data path coupling the source memory to the destination memory wherein the data path bypasses the central processing unit, an offload data transfer engine configured to execute the data transfer command set, wherein the offload data transfer engine includes: data transfer logic, configured to be responsive to at least one command of the data transfer command set, to transfer the block of update data in the data path from the source memory to the second region of the destination memory, wherein the data path bypasses the central processing unit, and transfer status logic, configured to be responsive to at least one command of the data transfer command set to confirm successful transfer of the block of update data, and to provide a successful transfer indication of successful transfer of the block of update data to the second region, and address map update logic, configured to be responsive to the successful transfer indication, to re-map the first logical address to a second physical address of the second region of the destination memory, instead of the first physical address of the first region of the destination memory.

In Example 2, the subject matter of Examples 1-8 (excluding the present Example) can optionally include wherein the data structure memory is further configured to store a free region log data structure having entries to indicate free regions of the destination memory, the system further comprising log update logic configured to update an entry of a free region log data structure to indicate that the first region is available for use to store other data, after the first logical address is re-mapped to the second region of the destination memory.

In Example 3, the subject matter of Examples 1-8 (excluding the present Example) can optionally include wherein each block transfer table entry is configured to map a logical address to a physical address of the destination memory and wherein the address map update logic is further configured to be responsive to the successful transfer indication, to update a block transfer table entry to re-map the first logical address to a second physical address of the second region of the destination memory, instead of the first physical address of the first region of the destination memory.

In Example 4, the subject matter of Examples 1-8 (excluding the present Example) can optionally include wherein the address map update logic is further configured to acquire a block aperture region resource, program the block aperture region resource to point to an entry of the block transfer table, and perform an atomic write to the entry so that the first logical address is mapped to the second physical address of the second region of the destination memory, to update a block transfer table entry.

In Example 5, the subject matter of Examples 1-8 (excluding the present Example) can optionally include wherein the offload data transfer engine includes the address map update logic and wherein the data transfer command set includes at least one map data transfer command from a central processing unit to the offload data transfer engine, to initiate a transfer of map entry data by the offload data transfer engine, from a source memory to a data structure memory, wherein the address map update logic is configured to be responsive to the map data transfer command, to transfer the map entry data from a source memory to a data structure memory so that the first logical address is mapped to the second physical address of the second region of the destination memory.

In Example 6, the subject matter of Examples 1-8 (excluding the present Example) can optionally include wherein the offload data transfer engine includes the log update logic and wherein the data transfer command set includes at least one log data transfer command from a central processing unit to the offload data transfer engine, to initiate a transfer of free region log data structure entry data by the offload data transfer engine, from a source memory to a data structure memory wherein the log update logic is configured to be responsive to the log data transfer command, to transfer the free region log data structure entry data from a source memory to a data structure memory so that the updating causes the free region log to indicate that the first region is available for use to store other data.

In Example 7, the subject matter of Examples 1-8 (excluding the present Example) can optionally include wherein the offload data transfer engine further includes error handling logic configured to, in response to the data transfer command set: detect an error in transferring data from the source memory to the destination memory, and in response to error detection, stop the transfer of data from the source memory to the destination memory, provide a transfer failure indication of unsuccessful transfer of data to the destination memory, and leave the mapping of the first logical address to the first physical address of the first region of the destination memory unchanged.

In Example 8, the subject matter of Examples 1-8 (excluding the present Example) can optionally include wherein the offload data transfer engine includes the address map update logic and wherein the data transfer command set includes at least one map data transfer command from a central processing unit to the offload data transfer engine, to initiate a transfer of map entry data by the offload data transfer engine, from a source memory to a data structure memory, wherein the address map update logic is configured to be responsive to the map data transfer command and responsive to the successful transfer indication, to transfer the map entry data from a source memory to a data structure memory so that the first logical address is mapped to the second physical address of the second region of the destination memory, wherein the offload data transfer engine further includes the log update logic and wherein the data transfer command set includes at least one log data transfer command from a central processing unit to the offload data transfer engine, to initiate a transfer of free region log data structure entry data by the offload data transfer engine, from a source memory to a data structure memory wherein the log update logic is configured to be responsive to the log data transfer command, to transfer the free region log data structure entry data from a source memory to a data structure memory so that the updating causes the free region log to indicate that the first region is available for use to store other data and wherein the offload data transfer engine further includes error handling logic configured to, in response to the data transfer command set: detect an error in transferring data from the source memory to a memory, and in response to error detection, stop the transfer of data, provide a transfer failure indication of unsuccessful transfer of data, leave the mapping of the first logical address to the first physical address of the first region of the destination memory unchanged, and leave the free region log unchanged to indicate that the first region is unavailable for use to store other data.

Example 9 is a method, comprising: forwarding a data transfer command set including at least one data transfer command from a central processing unit to an offload data transfer engine, to initiate a transfer by the offload data transfer engine of a block of data, from a source memory to a destination memory having first and second regions, the offload data transfer engine executing the data transfer command set, including: transferring the block of data in a transfer data path from the source memory to a second region of the destination memory, wherein the transfer data path bypasses the central processing unit, and confirming successful transfer of the block of data, and providing a successful transfer indication of successful transfer of the block of data to the second region, and in response to the successful transfer indication, re-mapping a first logical address to a physical address of the second region of the destination memory, instead of a physical address of the first region of the destination memory.

In Example 10, the subject matter of Examples 9-16 (excluding the present Example) can optionally include updating an entry of a free region log to indicate that the first region is available for use to store other data.

In Example 11, the subject matter of Examples 9-16 (excluding the present Example) can optionally include wherein the re-mapping includes updating a block transfer table comprising entries wherein each entry maps a logical address to a physical address of the destination memory.

In Example 12, the subject matter of Examples 9-16 (excluding the present Example) can optionally include wherein the updating a block transfer table includes acquiring a block aperture region resource, programming the block aperture region resource to point to an update entry of the block transfer table, performing an atomic write to the update entry so that the first logical address is mapped to the second physical address of the second region of the destination memory.

In Example 13, the subject matter of Examples 9-16 (excluding the present Example) can optionally include wherein the data transfer command set includes at least one data transfer command from a central processing unit to the offload data transfer engine, to initiate a transfer of map entry data by the offload data transfer engine, from a source memory to a destination memory so that the re-mapping includes the offload data transfer engine transferring the map entry data so that the first logical address is mapped to the second physical address of the second region of the destination memory.

In Example 14, the subject matter of Examples 9-16 (excluding the present Example) can optionally include wherein the data transfer command set includes at least one data transfer command from a central processing unit to the offload data transfer engine, to initiate a transfer of free region log entry data by the offload data transfer engine, from a source memory to a destination memory so that the updating an entry of a free region log causes the free region log to indicate that the first region is available for use to store other data.

In Example 15, the subject matter of Examples 9-16 (excluding the present Example) can optionally include wherein further in response to the data transfer command set, the offload data transfer engine: encountering an error in transferring data from the source memory to the destination memory, and in response to encountering the error, stopping the transferring of data from the source memory to the destination memory, providing a transfer failure indication of unsuccessful transfer of data to the destination memory, and leaving the mapping of the first logical address to the first physical address of the first region of the destination memory unchanged.

In Example 16, the subject matter of Examples 9-16 (excluding the present Example) can optionally include wherein the data transfer command set further includes at least one data transfer command from a central processing unit to the offload data transfer engine, to initiate a transfer of map entry data by the offload data transfer engine, from a source memory to a destination memory so that the re-mapping includes the offload data transfer engine transferring the map entry data so that the first logical address is mapped to the second physical address of the second region of the destination memory, and at least one data transfer command from a central processing unit to the offload data transfer engine, to initiate a transfer of free region log entry data by the offload data transfer engine, from a source memory to a destination memory to update an entry of a free region log cause the free region log to indicate that the first region is available for use to store other data, and wherein further in response to the data transfer command set, the offload data transfer engine in response to encountering an error in transferring data from the source memory to the destination memory, aborts execution of the data transfer command set to stop the transfer of data from the source memory to the destination memory, and provides a transfer failure indication of unsuccessful transfer of data to the destination memory.

Example 17 is an apparatus comprising means to perform a method as claimed in any preceding claim.

Example 18 is an apparatus for use with a central processing unit, comprising: a memory having a destination memory which includes a first destination region configured to store a first block of data, and a second destination region configured to store a second block of data, wherein the memory further has a data structure memory configured to store an address map data structure to map a first logical address to a first physical address of the first destination region, a source memory configured to store a block of update data to update data of the first block of data, and a command set memory configured to store a data transfer command set from a central processing unit, the data transfer command set including at least one data transfer command from a central processing unit to transfer a block of data, from the source memory to the destination memory, a data path coupling the source memory to the destination memory wherein the data path bypasses the central processing unit, an offload data transfer engine configured to execute the data transfer command set, wherein the offload data transfer engine includes: data transfer logic, configured to be responsive to at least one command of the data transfer command set, to transfer the block of update data in the data path from the source memory to the second region of the destination memory, wherein the data path bypasses the central processing unit, and transfer status logic, configured to be responsive to at least one command of the data transfer command set to confirm successful transfer of the block of update data, and to provide a successful transfer indication of successful transfer of the block of update data to the second region, and address map update logic, configured to be responsive to the successful transfer indication, to re-map the first logical address to a second physical address of the second region of the destination memory, instead of the first physical address of the first region of the destination memory.

In Example 19, the subject matter of Examples 18-26 (excluding the present Example) can optionally include wherein the data structure memory is further configured to store a free region log data structure having entries to indicate free regions of the destination memory, the apparatus further comprising log update logic configured to update an entry of a free region log data structure to indicate that the first region is available for use to store other data, after the first logical address is re-mapped to the second region of the destination memory.

In Example 20, the subject matter of Examples 18-26 (excluding the present Example) can optionally include wherein the address map data structure includes a block transfer table comprising entries wherein each block transfer table entry is configured to map a logical address to a physical address of the destination memory and wherein the address map update logic is further configured to be responsive to the successful transfer indication, to update a block transfer table entry to re-map the first logical address to a second physical address of the second region of the destination memory, instead of the first physical address of the first region of the destination memory.

In Example 21, the subject matter of Examples 18-26 (excluding the present Example) can optionally include wherein the address map update logic is further configured to acquire a block aperture region resource, program the block aperture region resource to point to an entry of the block transfer table, and perform an atomic write to the entry so that the first logical address is mapped to the second physical address of the second region of the destination memory, to update a block transfer table entry.

In Example 22, the subject matter of Examples 18-26 (excluding the present Example) can optionally include wherein the offload data transfer engine includes the address map update logic and wherein the data transfer command set includes at least one map data transfer command from a central processing unit to the offload data transfer engine, to initiate a transfer of map entry data by the offload data transfer engine, from a source memory to a data structure memory, wherein the address map update logic is configured to be responsive to the map data transfer command, to transfer the map entry data from a source memory to a data structure memory so that the first logical address is mapped to the second physical address of the second region of the destination memory.

In Example 23, the subject matter of Examples 18-26 (excluding the present Example) can optionally include wherein the offload data transfer engine includes the log update logic and wherein the data transfer command set includes at least one log data transfer command from a central processing unit to the offload data transfer engine, to initiate a transfer of free region log data structure entry data by the offload data transfer engine, from a source memory to a data structure memory wherein the log update logic is configured to be responsive to the log data transfer command, to transfer the free region log data structure entry data from a source memory to a data structure memory so that the updating causes the free region log to indicate that the first region is available for use to store other data.

In Example 24, the subject matter of Examples 18-26 (excluding the present Example) can optionally include wherein the offload data transfer engine further includes error handling logic configured to, in response to the data transfer command set: detect an error in transferring data from the source memory to the destination memory, and in response to error detection, stop the transfer of data from the source memory to the destination memory, provide a transfer failure indication of unsuccessful transfer of data to the destination memory, and leave the mapping of the first logical address to the first physical address of the first region of the destination memory unchanged.

In Example 25, the subject matter of Examples 18-26 (excluding the present Example) can optionally include wherein the offload data transfer engine includes the address map update logic and wherein the data transfer command set includes at least one map data transfer command from a central processing unit to the offload data transfer engine, to initiate a transfer of map entry data by the offload data transfer engine, from a source memory to a data structure memory, wherein the address map update logic is configured to be responsive to the map data transfer command and responsive to the successful transfer indication, to transfer the map entry data from a source memory to a data structure memory so that the first logical address is mapped to the second physical address of the second region of the destination memory, wherein the offload data transfer engine further includes the log update logic and wherein the data transfer command set includes at least one log data transfer command from a central processing unit to the offload data transfer engine, to initiate a transfer of free region log data structure entry data by the offload data transfer engine, from a source memory to a data structure memory wherein the log update logic is configured to be responsive to the log data transfer command, to transfer the free region log data structure entry data from a source memory to a data structure memory so that the updating causes the free region log to indicate that the first region is available for use to store other data and wherein the offload data transfer engine further includes error handling logic configured to, in response to the data transfer command set: detect an error in transferring data from the source memory to a memory, and in response to error detection, stop the transfer of data, provide a transfer failure indication of unsuccessful transfer of data, leave the mapping of the first logical address to the first physical address of the first region of the destination memory unchanged, and leave the free region log unchanged to indicate that the first region is unavailable for use to store other data.

In Example 26, the subject matter of Examples 18-26 (excluding the present Example) can optionally include a computing system comprising: a central processing unit and at least one of: a display communicatively coupled to the central processing unit, a network interface communicatively coupled to the central processing unit, and a battery coupled to provide power to the system.

Example 27 is a computer program product for a computing system wherein the computer program product comprises a computer readable storage medium having program instructions embodied therewith, the program instructions executable by a processor of the computing system to cause operations, the operations comprising: forwarding a data transfer command set including at least one data transfer command from a central processing unit of the computing system to an offload data transfer engine of the computing system, to initiate a transfer by the offload data transfer engine of a block of data, from a source memory of the computing system to a destination memory of the computing system having first and second regions, the offload data transfer engine executing the data transfer command set, including: transferring the block of data in a transfer data path from the source memory to a second region of the destination memory, wherein the transfer data path bypasses the central processing unit, and confirming successful transfer of the block of data, and providing a successful transfer indication of successful transfer of the block of data to the second region, and in response to the successful transfer indication, re-mapping a first logical address to a physical address of the second region of the destination memory, instead of a physical address of the first region of the destination memory.

In Example 28, the subject matter of Examples 27-34 (excluding the present Example) can optionally include wherein the operations further comprise updating an entry of a free region log to indicate that the first region is available for use to store other data.

In Example 29, the subject matter of Examples 27-34 (excluding the present Example) can optionally include wherein the re-mapping includes updating a block transfer table comprising entries wherein each entry maps a logical address to a physical address of the destination memory.

In Example 30, the subject matter of Examples 27-34 (excluding the present Example) can optionally include wherein the updating a block transfer table includes acquiring a block aperture region resource, programming the block aperture region resource to point to an update entry of the block transfer table, and performing an atomic write to the update entry so that the first logical address is mapped to the second physical address of the second region of the destination memory.

In Example 31, the subject matter of Examples 27-34 (excluding the present Example) can optionally include wherein the data transfer command set includes at least one data transfer command from a central processing unit to the offload data transfer engine, to initiate a transfer of map entry data by the offload data transfer engine, from a source memory to a destination memory so that the re-mapping includes the offload data transfer engine transferring the map entry data so that the first logical address is mapped to the second physical address of the second region of the destination memory.

In Example 32, the subject matter of Examples 27-34 (excluding the present Example) can optionally include wherein the data transfer command set includes at least one data transfer command from a central processing unit to the offload data transfer engine, to initiate a transfer of free region log entry data by the offload data transfer engine, from a source memory to a destination memory so that the updating an entry of a free region log causes the free region log to indicate that the first region is available for use to store other data.

In Example 33, the subject matter of Examples 27-34 (excluding the present Example) can optionally include wherein the operations further comprise, further in response to the data transfer command set, the offload data transfer engine: encountering an error in transferring data from the source memory to the destination memory, and in response to encountering the error, stopping the transferring of data from the source memory to the destination memory, providing a transfer failure indication of unsuccessful transfer of data to the destination memory, and leaving the mapping of the first logical address to the first physical address of the first region of the destination memory unchanged.

In Example 34, the subject matter of Examples 27-34 (excluding the present Example) can optionally include wherein the data transfer command set further includes at least one data transfer command from a central processing unit to the offload data transfer engine, to initiate a transfer of map entry data by the offload data transfer engine, from a source memory to a destination memory so that the re-mapping includes the offload data transfer engine transferring the map entry data so that the first logical address is mapped to the second physical address of the second region of the destination memory, and at least one data transfer command from a central processing unit to the offload data transfer engine, to initiate a transfer of free region log entry data by the offload data transfer engine, from a source memory to a destination memory to update an entry of a free region log cause the free region log to indicate that the first region is available for use to store other data, and wherein the operations further comprise, further in response to the data transfer command set, the offload data transfer engine in response to encountering an error in transferring data from the source memory to the destination memory, aborts execution of the data transfer command set to stop the transfer of data from the source memory to the destination memory, and provides a transfer failure indication of unsuccessful transfer of data to the destination memory.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching.

What is claimed is:

1. A system, comprising:
   at least one central processing unit;
   a memory having a destination memory which includes a first destination region configured to store a first block of data, and a second destination region configured to store a second block of data, wherein the memory further has a data structure memory configured to store an address map data structure to map a first logical address to a first physical address of the first destination region, a source memory configured to store a block of update data to update data of the first block of data, and a command set memory configured to store a data transfer command set from a central processing unit, the data transfer command set including at least one data transfer command from a central processing unit to transfer a block of data, from the source memory to the destination memory;

a data path coupling the source memory to the destination memory wherein the data path bypasses the central processing unit;

an offload data transfer engine configured to execute the data transfer command set, wherein the offload data transfer engine includes:

data transfer logic, configured to be responsive to at least one command of the data transfer command set, to transfer the block of update data in the data path from the source memory to the second region of the destination memory, wherein the data path bypasses the central processing unit; and transfer status logic, configured to be responsive to at least one command of the data transfer command set to confirm successful transfer of the block of update data, and to provide a successful transfer indication of successful transfer of the block of update data to the second region; and address map update logic, configured to be responsive to the successful transfer indication, to re-map the first logical address to a second physical address of the second region of the destination memory, instead of the first physical address of the first region of the destination memory.

2. The system of claim 1 wherein the data structure memory is further configured to store a free region log data structure having entries to indicate free regions of the destination memory, the system further comprising log update logic configured to update an entry of the free region log data structure to indicate that the first region is available for use to store other data, after the first logical address is re-mapped to the second region of the destination memory.

3. The system of claim 2 wherein the offload data transfer engine includes the log update logic and wherein the data transfer command set includes at least one log data transfer command from the central processing unit to the offload data transfer engine, to initiate a transfer of free region log data structure entry data by the offload data transfer engine, from the source memory to the data structure memory wherein the log update logic is configured to be responsive to the log data transfer command, to transfer the free region log data structure entry data from the source memory to the data structure memory so that the updating causes the free region log data structure to indicate that the first region is available for use to store other data.

4. The system of claim 2 wherein the offload data transfer engine includes the address map update logic and wherein the data transfer command set includes at least one map data transfer command from the central processing unit to the offload data transfer engine, to initiate a transfer of map entry data by the offload data transfer engine, from the source memory to the data structure memory, wherein the address map update logic is configured to be responsive to the at least one map data transfer command and responsive to the successful transfer indication, to transfer the map entry data from the source memory to the data structure memory so that the first logical address is mapped to the second physical address of the second region of the destination memory;

wherein the offload data transfer engine further includes the log update logic and wherein the data transfer command set includes at least one log data transfer command from a central processing unit to the offload data transfer engine, to initiate a transfer of free region log data structure entry data by the offload data transfer engine, from the source memory to the data structure memory wherein the log update logic is configured to be responsive to the at least one log data transfer command, to transfer the free region log data structure entry data from the source memory to the data structure memory so that the updating causes the free region log data structure to indicate that the first region is available for use to store other data and wherein the offload data transfer engine further includes error handling logic configured to, in response to the data transfer command set:

detect an error in transferring data from the source memory to a memory; and in response to error detection, stop the transfer of data, provide a transfer failure indication of unsuccessful transfer of data, leave the mapping of the first logical address to the first physical address of the first region of the destination memory unchanged, and leave the free region log data structure unchanged to indicate that the first region is unavailable for use to store other data.

5. The system of claim 1 wherein the address map data structure includes a block transfer table comprising entries wherein each block transfer table entry is configured to map a logical address to a physical address of the destination memory and wherein the address map update logic is further configured to be responsive to the successful transfer indication, to update a block transfer table entry to re-map the first logical address to a second physical address of the second region of the destination memory, instead of the first physical address of the first region of the destination memory.

6. The system of claim 5 wherein the address map update logic is further configured to acquire a block aperture region resource, program the block aperture region resource to point to an entry of the block transfer table, and perform an atomic write to the entry so that the first logical address is mapped to the second physical address of the second region of the destination memory, to update a block transfer table entry.

7. The system of claim 1 wherein the offload data transfer engine includes the address map update logic and wherein the data transfer command set includes at least one map data transfer command from the central processing unit to the offload data transfer engine, to initiate a transfer of map entry data by the offload data transfer engine, from the source memory to the data structure memory, wherein the address map update logic is configured to be responsive to the at least one map data transfer command, to transfer the map entry data from the source memory to the data structure memory so that the first logical address is mapped to the second physical address of the second region of the destination memory.

8. The system of claim 1, wherein the offload data transfer engine further includes error handling logic configured to, in response to the data transfer command set:

detect an error in transferring data from the source memory to the destination memory; and in response to error detection, stop the transfer of data from the source memory to the destination memory, provide a transfer failure indication of unsuccessful transfer of data to the destination memory, and leave the mapping of the first logical address to the first physical address of the first region of the destination memory unchanged.

9. A method, comprising:
forwarding a data transfer command set including at least one data transfer command from a central processing unit to an offload data transfer engine, to initiate a transfer by the offload data transfer engine of a block of data, from a source memory to a destination memory having first and second regions;
the offload data transfer engine executing the data transfer command set, including:
transferring the block of data in a transfer data path from the source memory to a second region of the destination memory, wherein the transfer data path bypasses the central processing unit; and
confirming successful transfer of the block of data, and providing a successful transfer indication of successful transfer of the block of data to the second region; and
in response to the successful transfer indication, re-mapping a first logical address to a physical address of the second region of the destination memory, instead of a physical address of the first region of the destination memory.

10. The method of claim 9 further comprising updating an entry of a free region log to indicate that the first region is available for use to store other data.

11. The method of claim 10 wherein the data transfer command set includes at least one data transfer command from a central processing unit to the offload data transfer engine, to initiate a transfer of free region log entry data by the offload data transfer engine, from the source memory to the destination memory so that the updating an entry of a free region log causes the free region log to indicate that the first region is available for use to store other data.

12. The method of claim 9 wherein the re-mapping includes updating a block transfer table comprising entries wherein each entry maps a logical address to a physical address of the destination memory.

13. The method of claim 12 wherein the updating a block transfer table includes acquiring a block aperture region resource, programming the block aperture region resource to point to an update entry of the block transfer table, performing an atomic write to the update entry so that the first logical address is mapped to the second physical address of the second region of the destination memory.

14. The method of claim 9 wherein the data transfer command set includes at least one data transfer command from the central processing unit to the offload data transfer engine, to initiate a transfer of map entry data by the offload data transfer engine, from the source memory to the destination memory so that the re-mapping includes the offload data transfer engine transferring the map entry data so that the first logical address is mapped to the second physical address of the second region of the destination memory.

15. The method of claim 9, further in response to the data transfer command set, the offload data transfer engine:
encountering an error in transferring data from the source memory to the destination memory; and
in response to encountering the error, stopping the transferring of data from the source memory to the destination memory, providing a transfer failure indication of unsuccessful transfer of data to the destination memory, and leaving the mapping of the first logical address to the first physical address of the first region of the destination memory unchanged.

16. The method of claim 9 wherein the data transfer command set further includes at least one data transfer command from the central processing unit to the offload data transfer engine, to initiate a transfer of map entry data by the offload data transfer engine, from the source memory to the destination memory so that the re-mapping includes the offload data transfer engine transferring the map entry data so that the first logical address is mapped to the second physical address of the second region of the destination memory, and at least one data transfer command from the central processing unit to the offload data transfer engine, to initiate a transfer of free region log entry data by the offload data transfer engine, from the source memory to the destination memory to update an entry of a free region log cause the free region log to indicate that the first region is available for use to store other data, and wherein further in response to the data transfer command set, the offload data transfer engine in response to encountering an error in transferring data from the source memory to the destination memory, aborts execution of the data transfer command set to stop the transfer of data from the source memory to the destination memory, and provides a transfer failure indication of unsuccessful transfer of data to the destination memory.

17. An apparatus for use with a central processing unit, comprising:
a memory having a destination memory which includes a first destination region configured to store a first block of data, and a second destination region configured to store a second block of data, wherein the memory further has a data structure memory configured to store an address map data structure to map a first logical address to a first physical address of the first destination region, a source memory configured to store a block of update data to update data of the first block of data, and a command set memory configured to store a data transfer command set from a central processing unit, the data transfer command set including at least one data transfer command from a central processing unit to transfer a block of data, from the source memory to the destination memory;
a data path coupling the source memory to the destination memory wherein the data path bypasses the central processing unit;
an offload data transfer engine configured to execute the data transfer command set, wherein the offload data transfer engine includes:
data transfer logic, configured to be responsive to at least one command of the data transfer command set, to transfer the block of update data in the data path from the source memory to the second region of the destination memory, wherein the data path bypasses the central processing unit; and
transfer status logic, configured to be responsive to at least one command of the data transfer command set to confirm successful transfer of the block of update data, and to provide a successful transfer indication of successful transfer of the block of update data to the second region; and
address map update logic, configured to be responsive to the successful transfer indication, to re-map the first logical address to a second physical address of the second region of the destination memory, instead of the first physical address of the first region of the destination memory.

18. The apparatus of claim 17 wherein the data structure memory is further configured to store a free region log data structure having entries to indicate free regions of the destination memory, the apparatus further comprising log update logic configured to update an entry of the free region log data structure to indicate that the first region is available for use to store other data, after the first logical address is re-mapped to the second region of the destination memory.

19. The apparatus of claim 18 wherein the offload data transfer engine includes the log update logic and wherein the data transfer command set includes at least one log data transfer command from the central processing unit to the offload data transfer engine, to initiate a transfer of free region log data structure entry data by the offload data transfer engine, from the source memory to the data structure memory wherein the log update logic is configured to be responsive to the at least one log data transfer command, to transfer the free region log data structure entry data from the source memory to the data structure memory so that the updating causes the free region log data structure to indicate that the first region is available for use to store other data.

20. The apparatus of claim 17, wherein the offload data transfer engine further includes error handling logic configured to, in response to the data transfer command set:
  detect an error in transferring data from the source memory to the destination memory; and
  in response to error detection, stop the transfer of data from the source memory to the destination memory, provide a transfer failure indication of unsuccessful transfer of data to the destination memory, and leave the mapping of the first logical address to the first physical address of the first region of the destination memory unchanged.

21. The apparatus of claim 17 wherein the address map data structure includes a block transfer table comprising entries wherein each block transfer table entry is configured to map a logical address to a physical address of the destination memory and wherein the address map update logic is further configured to be responsive to the successful transfer indication, to update a block transfer table entry to re-map the first logical address to a second physical address of the second region of the destination memory, instead of the first physical address of the first region of the destination memory.

22. The apparatus of claim 21 wherein the address map update logic is further configured to acquire a block aperture region resource, program the block aperture region resource to point to an entry of the block transfer table, and perform an atomic write to the entry so that the first logical address is mapped to the second physical address of the second region of the destination memory, to update a block transfer table entry.

23. The apparatus of claim 17 wherein the offload data transfer engine includes the address map update logic and wherein the data transfer command set includes at least one map data transfer command from the central processing unit to the offload data transfer engine, to initiate a transfer of map entry data by the offload data transfer engine, from the source memory to the data structure memory, wherein the address map update logic is configured to be responsive to the at least one map data transfer command, to transfer the map entry data from the source memory to the data structure memory so that the first logical address is mapped to the second physical address of the second region of the destination memory.

24. The apparatus of claim 18 wherein the offload data transfer engine includes the address map update logic and wherein the data transfer command set includes at least one map data transfer command from the central processing unit to the offload data transfer engine, to initiate a transfer of map entry data by the offload data transfer engine, from the source memory to the data structure memory, wherein the address map update logic is configured to be responsive to the at least one map data transfer command and responsive to the successful transfer indication, to transfer the map entry data from the source memory to the data structure memory so that the first logical address is mapped to the second physical address of the second region of the destination memory;
  wherein the offload data transfer engine further includes the log update logic and wherein the data transfer command set includes at least one log data transfer command from the central processing unit to the offload data transfer engine, to initiate a transfer of free region log data structure entry data by the offload data transfer engine, from the source memory to the data structure memory wherein the log update logic is configured to be responsive to the at least one log data transfer command, to transfer the free region log data structure entry data from the source memory to the data structure memory so that the updating causes the free region log data structure to indicate that the first region is available for use to store other data and
  wherein the offload data transfer engine further includes error handling logic configured to, in response to the data transfer command set:
  detect an error in transferring data from the source memory to the memory; and
  in response to error detection, stop the transfer of data, provide a transfer failure indication of unsuccessful transfer of data, leave the mapping of the first logical address to the first physical address of the first region of the destination memory unchanged, and leave the free region log data structure unchanged to indicate that the first region is unavailable for use to store other data.

* * * * *